(12) United States Patent
Ladd, Jr. et al.

(10) Patent No.: US 10,362,730 B2
(45) Date of Patent: Jul. 30, 2019

(54) QUICK CHANGE LAWN MOWER BLADES

(71) Applicant: MTD Products Inc, Valley City, OH (US)

(72) Inventors: Timothy Ladd, Jr., Grafton, OH (US); Gary Hobrath, Brunswick, OH (US); Axel Schaedler, Olmsted Township, OH (US); Brian Milliff, Cleveland, OH (US)

(73) Assignee: MTD Products Inc, Valley City, OH (US)

( * ) Notice: Subject to any disclaimer, the term of this patent is extended or adjusted under 35 U.S.C. 154(b) by 618 days.

(21) Appl. No.: 14/847,909

(22) Filed: Sep. 8, 2015

(65) Prior Publication Data

US 2016/0120122 A1    May 5, 2016

Related U.S. Application Data

(60) Provisional application No. 62/046,303, filed on Sep. 5, 2014, provisional application No. 62/171,518, filed on Jun. 5, 2015.

(51) Int. Cl.
*A01D 34/73* (2006.01)
*A01D 34/64* (2006.01)
(Continued)

(52) U.S. Cl.
CPC .......... *A01D 34/733* (2013.01); *A01D 34/64* (2013.01); *A01D 34/835* (2013.01); *A01D 2101/00* (2013.01)

(58) Field of Classification Search
CPC .... A01D 34/733; A01D 34/736; A01D 34/62; A01D 34/63; A01D 34/64; A01D 34/68;
(Continued)

(56) References Cited

U.S. PATENT DOCUMENTS 2,232,261 A    2/1941   Orr
2,477,442 A    7/1949   Cramer, Jr.
(Continued)

FOREIGN PATENT DOCUMENTS

CA    2495349 A1 *   7/2005   ............. A01D 34/73
DE    3611511 A1     10/1987
(Continued)

OTHER PUBLICATIONS

Husqvarna (54") Rapid Release Tractor Hi Lift Mower Blade, Husqvarna.
(Continued)

*Primary Examiner* — Thomas B Will
*Assistant Examiner* — Joan D Misa
(74) *Attorney, Agent, or Firm* — Wegman, Hessler & Vanderburg

(57) ABSTRACT

A mower blade assembly attaches to a rotatable spindle and includes a mounting plate which defines a first pin aperture. The mounting plate and a retaining plate are attached to the rotatable spindle. The retaining plate defines a second pin aperture. A movable pin plate comprises a pin. A blade is selectively attachable to the mounting plate. The blade defines a retaining plate aperture and a third pin aperture. A biasing member urges the movable pin plate from a disengaged position to an engaged position. The pin is engageable with the pin apertures for mounting and retaining the cutting blade to the mounting plate. The blade is attached by moving the blade over the retaining plate aperture, urging the movable pin plate to the disengaged position, rotating the blade, and releasing the movable pin plate. Another embodiment includes a force finger.

12 Claims, 19 Drawing Sheets

(51) Int. Cl.
  *A01D 34/835* (2006.01)
  *A01D 101/00* (2006.01)
(58) Field of Classification Search
  CPC ..... A01D 34/73; A01D 2101/00; Y10S 56/17; Y10S 56/20
  See application file for complete search history.

(56) References Cited

U.S. PATENT DOCUMENTS

| | | | |
|---|---|---|---|
| 2,527,472 A | 10/1950 | Wolf | |
| 2,651,159 A | 9/1953 | Rountree, Sr. | |
| 2,850,862 A * | 9/1958 | Asbury | A01D 34/736 30/347 |
| 2,875,569 A | 3/1959 | Sauer | |
| 2,924,059 A | 2/1960 | Beeston | |
| 2,963,844 A | 12/1960 | Engler | |
| 3,050,925 A | 8/1962 | West | |
| 3,103,093 A | 9/1963 | House, Jr. | |
| 3,152,432 A | 10/1964 | Birkenbach | |
| 3,243,944 A | 4/1966 | Michaud | |
| 3,321,894 A | 5/1967 | Ingram | |
| 3,327,460 A | 6/1967 | Blackstone | |
| 3,563,015 A | 2/1971 | Renfroe | |
| 3,564,824 A * | 2/1971 | Tygh, Jr. | A01D 34/73 56/295 |
| 3,683,606 A | 8/1972 | Staines | |
| 3,698,168 A | 10/1972 | Mott | |
| 3,958,402 A | 5/1976 | Bouet | |
| 4,229,933 A | 10/1980 | Bernard | |
| 4,237,610 A * | 12/1980 | Bradus | A01D 34/416 30/276 |
| 4,265,018 A * | 5/1981 | Schrock | A01D 34/73 30/276 |
| 4,302,878 A * | 12/1981 | Bonforte | A01D 34/73 30/347 |
| 4,313,297 A | 2/1982 | Maier | |
| 4,375,148 A | 3/1983 | Beck | |
| 4,413,468 A * | 11/1983 | Hockersmith | A01D 34/733 56/295 |
| 4,525,990 A | 7/1985 | Zweegers | |
| 4,586,257 A | 5/1986 | Rittenhouse | |
| 4,611,459 A | 9/1986 | Gartner | |
| 4,657,428 A | 4/1987 | Wiley | |
| 4,712,364 A | 12/1987 | Oxley | |
| 4,730,952 A * | 3/1988 | Wiley | B24B 45/006 30/388 |
| 4,750,320 A | 6/1988 | Liebl | |
| 4,815,264 A | 3/1989 | Mijnders | |
| 4,936,884 A * | 6/1990 | Campbell | A01D 34/4168 30/276 |
| 5,018,347 A | 5/1991 | Feilen | |
| 5,019,113 A | 5/1991 | Burnell | |
| 5,094,065 A | 3/1992 | Azbell | |
| 5,271,212 A | 12/1993 | Anderson | |
| 5,284,006 A * | 2/1994 | Sheldon | A01D 34/005 56/255 |
| 5,287,686 A | 2/1994 | Lindsay | |
| 5,383,329 A | 1/1995 | Cornell | |
| 5,438,819 A | 8/1995 | Dallman | |
| 5,502,958 A * | 4/1996 | Plamper | A01D 34/733 56/17.5 |
| 5,575,071 A | 11/1996 | Phillips | |
| 5,724,796 A | 3/1998 | Plamper | |
| 5,782,073 A | 7/1998 | Sheldon | |
| 5,791,131 A | 8/1998 | Hill | |
| 5,839,263 A | 11/1998 | Biernath | |
| 5,852,876 A | 12/1998 | Wang | |
| 5,862,598 A | 1/1999 | Lee | |
| 5,881,540 A | 3/1999 | Miller | |
| 5,946,895 A | 9/1999 | Martens | |
| 6,205,755 B1 | 3/2001 | Bontrager | |
| 6,612,039 B2 | 9/2003 | Kakiuchi | |
| 6,681,865 B2 | 1/2004 | Pace | |
| 6,722,114 B1 | 4/2004 | Poole | |
| 6,935,095 B1 | 8/2005 | Sluder | |
| 7,124,566 B2 * | 10/2006 | Treger | A01D 34/73 56/295 |
| 7,127,877 B2 | 10/2006 | Curran | |
| 7,387,563 B2 * | 6/2008 | Allemann | A61C 3/06 451/342 |
| 7,484,736 B2 * | 2/2009 | Allemann | B24B 45/006 279/143 |
| 7,703,268 B2 | 4/2010 | Yanke | |
| 7,775,026 B2 | 8/2010 | Bever | |
| 7,871,080 B2 | 1/2011 | Marini | |
| 7,958,710 B2 | 6/2011 | Gilpatrick | |
| 8,136,333 B1 | 3/2012 | Levin | |
| 8,869,369 B1 | 10/2014 | Roach | |
| 8,935,909 B2 * | 1/2015 | Eavenson, Sr. | A01D 34/733 56/255 |
| 9,113,595 B2 | 8/2015 | Roth | |
| 9,485,910 B2 | 11/2016 | Lebeau | |
| 9,560,800 B2 | 2/2017 | Reichen | |
| 9,924,632 B2 * | 3/2018 | Chenevert | A01D 34/733 |
| 2002/0106279 A1 | 8/2002 | Selby | |
| 2003/0074874 A1 * | 4/2003 | Schaedler | A01D 34/73 56/255 |
| 2004/0006962 A1 * | 1/2004 | Plamper | A01D 34/6806 56/255 |
| 2004/0093842 A1 | 5/2004 | Cooper | |
| 2005/0210852 A1 | 9/2005 | Lancaster | |
| 2005/0229573 A1 | 10/2005 | Curran | |
| 2006/0168933 A1 | 8/2006 | Hill | |
| 2006/0230622 A1 | 10/2006 | Skluzak | |
| 2008/0277127 A1 | 11/2008 | Dixon | |
| 2009/0308045 A1 | 12/2009 | Bever | |
| 2010/0257832 A1 | 10/2010 | Smith | |
| 2012/0110970 A1 | 5/2012 | Blarek | |
| 2013/0269192 A1 * | 10/2013 | Pellenc | A01D 34/733 30/276 |
| 2013/0327007 A1 | 12/2013 | Eavenson, Sr. | |
| 2014/0208710 A1 * | 7/2014 | Roth | A01D 34/733 56/255 |
| 2016/0014957 A1 | 1/2016 | Johansson | |
| 2016/0037716 A1 | 2/2016 | Johansson | |
| 2016/0120122 A1 | 5/2016 | Ladd | |
| 2016/0242355 A1 | 8/2016 | Talaski | |
| 2016/0157424 A1 | 9/2016 | Roth | |
| 2017/0020067 A1 | 1/2017 | Haun | |
| 2017/0332549 A1 * | 11/2017 | Ladd, Jr. | A01D 34/64 |
| 2018/0077864 A1 * | 3/2018 | Hobrath | A01D 34/733 |

FOREIGN PATENT DOCUMENTS

| | | |
|---|---|---|
| DE | 10 2008 056240 | 10/2010 |
| EP | 1 048 197 | 11/2000 |
| EP | 1 815 732 | 8/2007 |
| EP | 2 664 229 | 11/2013 |
| FR | 2792162 | 10/2000 |
| NL | 8403911 | 7/1986 |
| WO | 2013048574 | 4/2013 |
| WO | 2013049316 | 4/2013 |
| WO | 2013049324 | 4/2013 |
| WO | 2013188335 | 12/2013 |
| WO | 2016199163 A1 | 12/2016 |

OTHER PUBLICATIONS

Ed Parratore, Husqqvarna introduces a toolfree way to change mower blades, Consumer Reports, Oct. 29, 2012.
Amazone: Quality Machines, Jun. 2007, Published in France.
International Search Report and Written Opinion for corresponding International Application No. PCT/US2015/048946 dated Dec. 4, 2015.
International Search Report and Written Opinion dated Jun. 4, 2014 for corresponding International Patent Application No. PCT/US2014/016436.
International Search Report and Written Opinion dated Feb. 17, 2014 for corresponding International Patent Application No. PCT/US2013/045076.

(56) References Cited

OTHER PUBLICATIONS

Office Action dated Mar. 21, 2016 for U.S. Appl. No. 15/663,375 (pp. 1-7).
Notice of Allowance dated Jun. 28, 2018 for U.S. Appl. No. 15/663,375 (pp. 1-7).
Corrected Notice of Allowability dated Oct. 17, 2018 for U.S. Appl. No. 15/663,375 (pp. 1-2).

* cited by examiner

QUICK CHANGE LAWN MOWER BLADES

This application claims the benefit of U.S. Provisional Application No. 62/046,303, filed Sep. 5, 2014 and U.S. Provisional Application No. 62/171,518, filed Jun. 5, 2015, the entire disclosures of which are hereby incorporated herein by reference.

BACKGROUND

1. Field of the Disclosure

The present disclosure relates to lawn and garden equipment, and more particularly, to a replaceable blade assembly for a mower.

2. Description of Related Art

Currently available lawn mowers such as walk-behind mowers, riding mowers, garden tractors, and the like include a cutting deck having at least one cutting blade configured to cut grass and other vegetation. However, normal usage and cutting blade contact with rocks, tree branches, or other debris can cause the cutting blade to dull or otherwise become ineffective. Typical cutting blades for rotary mowers include one-piece blades that are attached and retained using hardware which requires tools to remove and replace the cutting blade. Cutting blade changes can also require actions that may discourage mower operators from changing or sharpening the cutting blade, such as lifting or tilting the lawn mower.

Therefore, a need exists for a mower blade assembly having a replaceable cutting blade that can be easily replaced without the need for tools. A need also exists for a mower blade assembly in which the cutting blade is replaceable and self-securing while also being easily removable.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a mower blade assembly attachable to a rotatable spindle, motor, or engine crankshaft. The mower blade assembly includes a mounting plate. The mounting plate includes a bearing surface. The mounting plate defines a central bore and a first pin aperture. The mounting plate is attached to the rotatable spindle. The mower blade assembly also includes a retaining plate attached to the rotatable spindle. The retaining plate defines a central bore and a second pin aperture. The mower blade assembly further includes a movable pin plate that defines a central bore and comprises a pin. The mower blade assembly still further includes a cutting blade selectively attachable to the mounting plate. The cutting blade defines a retaining plate aperture and a third pin aperture. The mower blade assembly also includes a biasing member configured to urge the movable pin plate from a disengaged position to an engaged position. In the engaged position, the pin is operatively engageable with the first pin aperture, the second pin aperture, and the third pin aperture for operatively mounting and retaining the cutting blade to the mounting plate.

According to another aspect, the subject application involves a mower blade assembly attachable to a rotatable spindle, motor, or engine crankshaft, said mower blade assembly. The mower blade assembly includes a mounting plate including a bearing surface. The mounting plate defines a central bore and a first pin aperture, and the mounting plate is attached to the rotatable spindle. The mower blade assembly also includes a retaining plate attached to the rotatable spindle. The retaining plate defines a central bore and a second pin aperture. The mower blade assembly further includes a movable pin plate. The movable pin plate defines a central bore and the movable pin plate includes a pin and a force finger. The mower blade assembly still further includes a cutting blade selectively attachable to the mounting plate. The cutting blade defines a retaining plate aperture, a third pin aperture, and a force finger aperture. The mower blade assembly also includes a biasing member configured to urge the force finger through the force finger aperture. The biasing member is also configured to urge the movable pin plate from a disengaged position to an engaged position such that the pin is operatively engageable with the first pin aperture, the second pin aperture, and the third pin aperture for operatively mounting and retaining the cutting blade to the mounting plate.

According to another aspect, the subject application involves a method of mounting and retaining a cutting blade to a rotatable spindle, motor, or engine crankshaft. The method includes the step of providing a mower blade assembly including a movable pin plate. The method also includes the step of moving the cutting blade to contact a portion of the mower blade assembly. The method further includes the step of urging the movable pin plate to a disengaged position. The method still further includes the step of rotating the cutting blade. The method also includes the step of releasing the movable pin plate such that the movable pin plate returns to an engaged position for operatively mounting and retaining the cutting blade to the rotatable spindle, motor, or engine crankshaft.

According to another aspect, the subject application involves a method of mounting and retaining a cutting blade to a rotatable spindle, motor, or engine crankshaft. The method includes the step of providing a mower blade assembly. The mower blade assembly includes a mounting plate including a bearing surface. The mounting plate defines a central bore and a first pin aperture, and the mounting plate is attached to the rotatable spindle. The mower blade assembly also includes a retaining plate attached to the rotatable spindle. The retaining plate defines a central bore and a second pin aperture. The mower blade assembly further includes a movable pin plate that defines a central bore and includes a pin and a force finger. The mower blade assembly still further includes a cutting blade selectively attachable to the mounting plate. The cutting blade defines a retaining plate aperture, a force finger aperture and a third pin aperture. The mower blade assembly also includes a biasing member configured to urge the force finger through the force finger aperture. The biasing member is also configured to urge the movable pin plate from a disengaged position to an engaged position such that the pin is operatively engageable with the first pin aperture, the second pin aperture, and the third pin aperture for operatively mounting and retaining the cutting blade to the mounting plate. The method also includes the step of moving the cutting blade over the retaining plate aperture. The method further includes the step of urging the movable pin plate to the disengaged position. The method still further includes the step of rotating the cutting blade to align the pin with the third pin aperture. The method also includes the step of releasing the movable pin plate such that the movable pin plate returns to the engaged position and the pin engages the third pin aperture.

According to another aspect, the subject application involves a mower blade for a lawn maintenance device including an elongate blade having opposed end edges and opposed side edges. The mower blade is adapted for mounting onto a rotary mower for rotation about a center axis extended transverse to the elongate blade and separating the elongate blade into opposed elongate end portions extended from the center axis, the elongate blade having a blade major axis. The elongate blade defines a third pin aperture positioned a distance from the center axis. The elongate blade also defines a force finger aperture positioned a distance from the center axis and a distance away from the third pin aperture.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION

Figure 1:
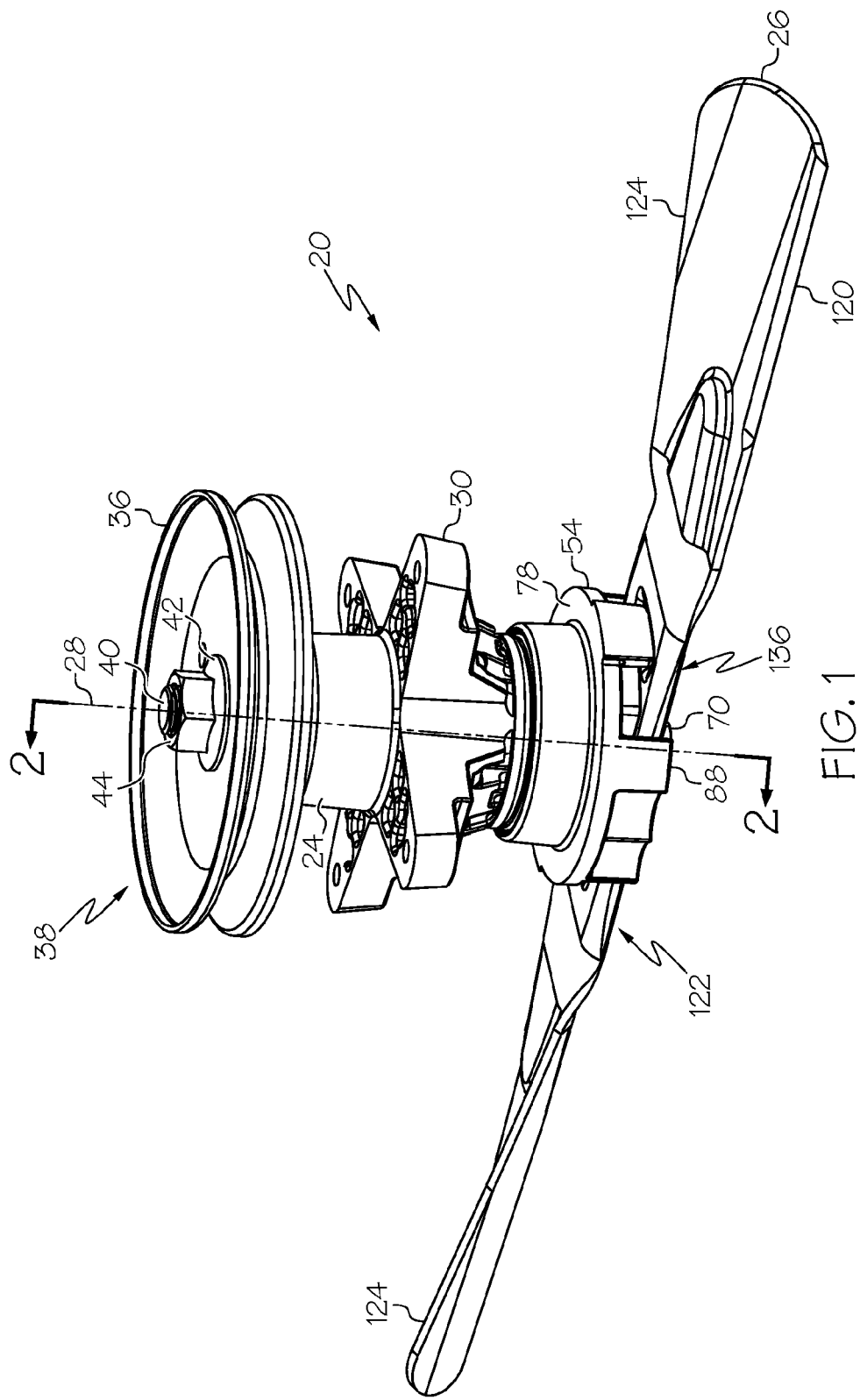
FIG. 1 is a perspective view of an example mower blade assembly in accordance with aspects of the present disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Referring to FIG. 1, an exemplary embodiment of a mower blade assembly 20 attachable to a rotatable spindle 24, motor, or engine crankshaft is shown. FIG. 1 shows a perspective view of the mower blade assembly 20 according to at least one aspect of the present disclosure. The mower blade assembly 20 is operatively positioned within a cutting deck of any type of lawn mower (not shown), including a walk-behind style lawn mower, a garden tractor, a riding lawn mower, or the like. In an embodiment, the mower blade assembly 20 is connected to a motor or engine crankshaft (not shown) that extends downwardly through the cutting deck. In another embodiment, the mower blade assembly 20 is connected to the rotatable spindle 24 located above a cutting deck. The mower blade assembly 20 provides a removable connection for a cutting blade 26 within the deck and is rotatable about a substantially vertical rotational axis 28 defined by the motor or engine crankshaft or the spindle to which it is attached. It is to be understood that construction and assembly structures of various mowing devices vary, and at least two examples are shown in the figures and are described herein. These are not meant to be limiting examples, and any suitable type of mowing device may be used in conjunction with the present disclosure.

Figure 2:
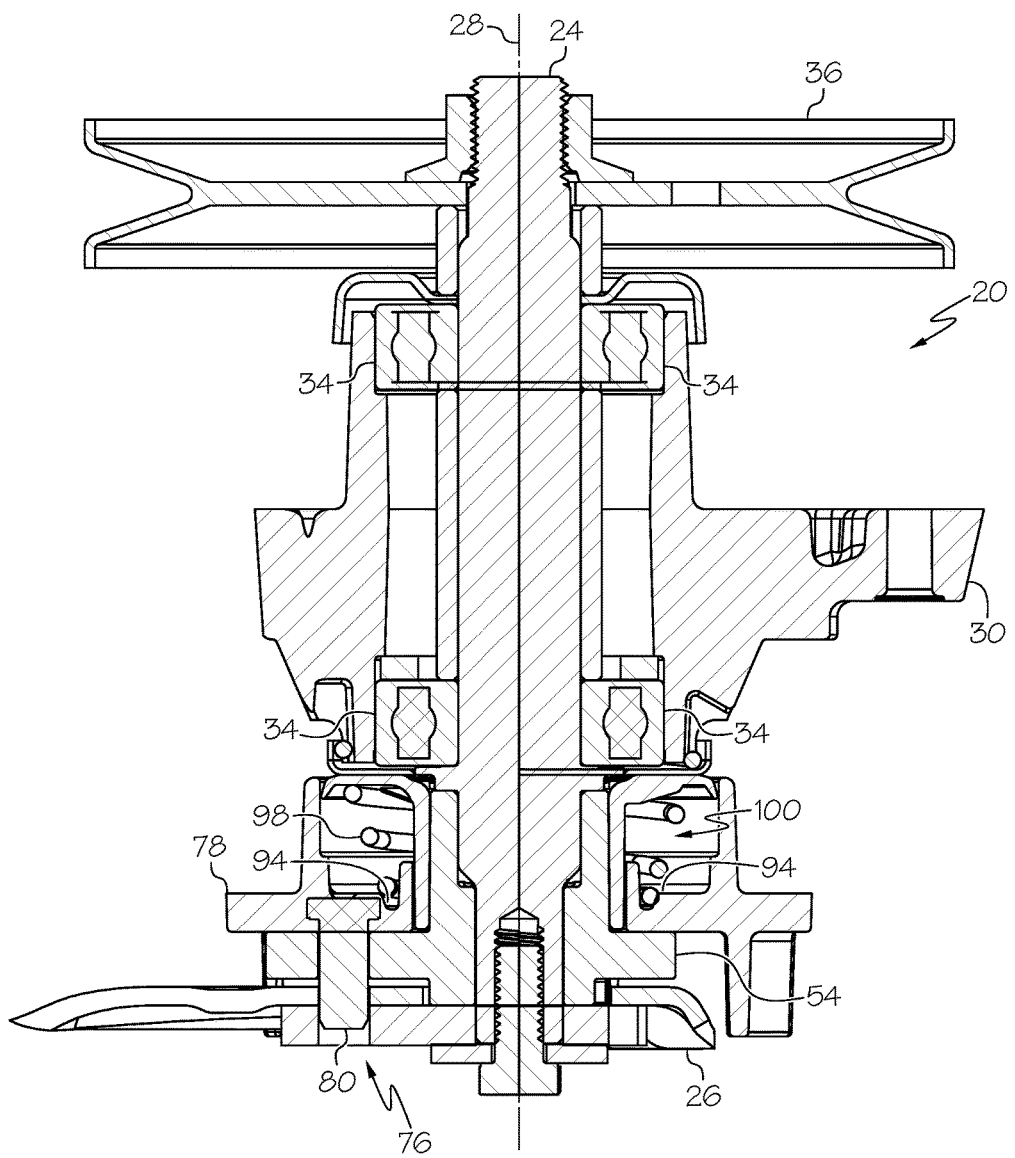
FIG. 2 is a cross section view of the mower blade assembly taken along line 2-2 of FIG. 1.

As shown in FIG. 2, the rotatable spindle 24 can pass through a bearing block 30. The bearing block 30 can include a bearing 34 which enables the rotatable spindle 24 to rotate relative to the bearing block 30. The bearing block 30 can be mounted to some structure (not shown) of the mowing device, including a mower frame, a mowing deck, etc. A length of the rotatable spindle 24 can extend above the bearing block 30 and be connected to a drive mechanism. Any suitable drive mechanism can be attached to the rotatable spindle 24, including, but not limited to a drive pulley 36, or gears (not shown) for direct drive, or the rotatable spindle 24 may be the engine crank shaft, etc. As shown in FIG. 1, the rotatable spindle can include an upper end 38 including male threads 40 configured for a washer 42 and a machine nut 44 to fasten the drive pulley 36 to the rotatable spindle 24.

Figure 3:
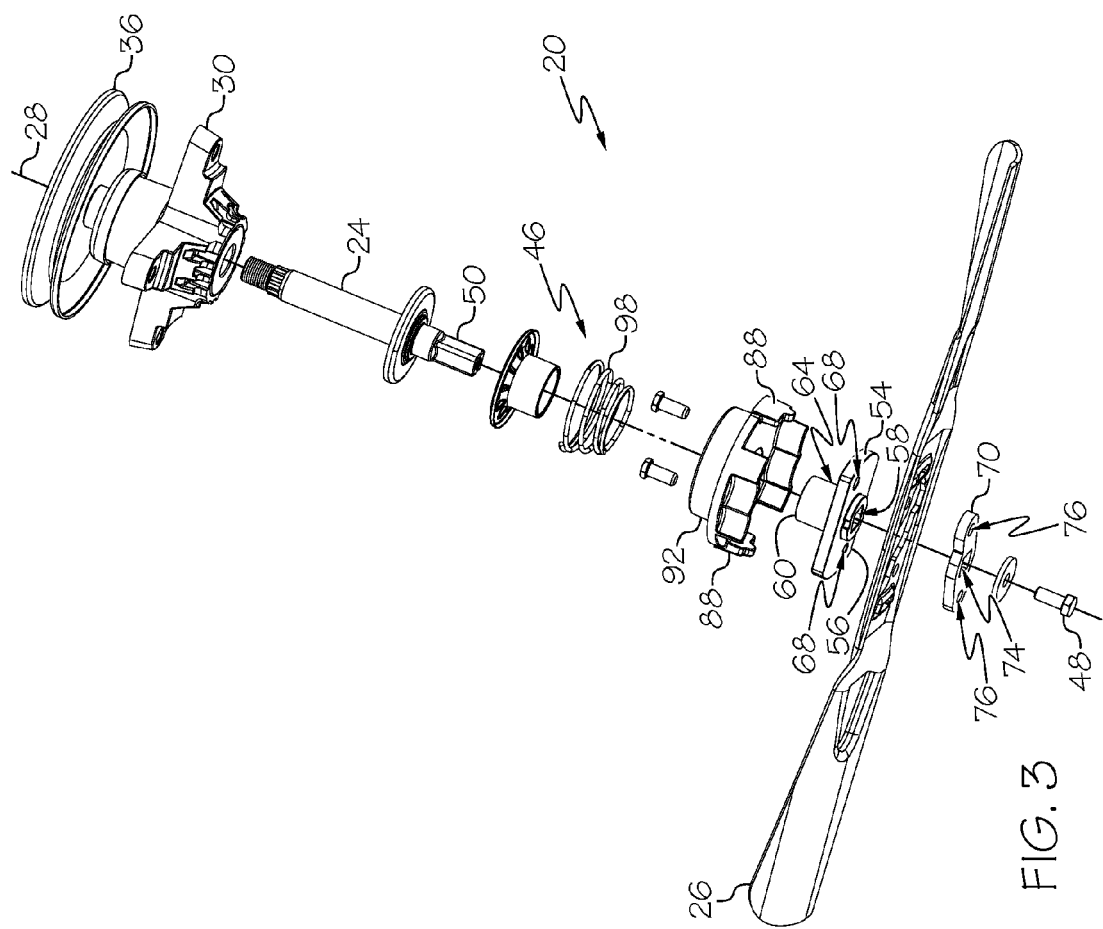
FIG. 3 is an exploded view of the mower blade assembly of FIG. 1.

Turning to FIG. 3, the rotatable spindle 24 can include a lower end 46 including male threads 47 configured for a machine nut 48 to fasten other components to the rotatable spindle 24. Additionally, a portion of the lower end 46 can include a non-circular cross-section 50. For example, the non-circular cross-section 50 can be D-shaped or double-D shaped to reduce and/or eliminate slippage when the rotatable spindle 24 is mated to other structure(s) which will be described below.

The mower blade assembly 20 includes a mounting plate 54 attached to the rotatable spindle 24. The mounting plate 54 can be configured to be a generally flat portion 56 and define a central bore 58 centered about the axis 28. The mounting plate 54 can further include a central, cylindrical appendage 60, and an exterior surface 64 of the cylindrical appendage 60 defines a bearing surface. The central bore 58 can extend through the generally flat portion 56 and the cylindrical appendage 60. The central bore 58 can be configured to include a non-circular cross-section configured to cooperate with the non-circular cross-section 50 of the rotatable spindle 24. As described above, the central bore 58 can include a D-shaped or double-D shaped cross-section to reduce and/or eliminate slippage while transferring rotational power between the rotatable spindle 24 and the mounting plate 54. The mounting plate 54 further defines a first pin aperture 68. As shown in the example of FIG. 3, the mounting plate 54 can define two first pin apertures 68; however, any number of first pin apertures 68 can be defined by the mounting plate 54.

The mower blade assembly 20 further includes a retaining plate 70 attached to the rotatable spindle 24. The retaining plate 70 defines a central bore 74 which is centered about the axis 28. As described above, the central bore 74 can be configured to include a non-circular cross-section configured to cooperate with the non-circular cross-section 50 of the rotatable spindle 24, such as a D-shaped or double-D shaped cross-section to reduce and/or eliminate slippage while transferring rotational power between the rotatable spindle 24 and the retaining plate 70. The retaining plate 70 defines a second pin aperture 76, and the location of the second pin aperture 76 with respect to the axis 28 is identical to the location of the first pin aperture 68.

The mower blade assembly 20 also includes a movable pin plate 78 slidingly attached to the rotatable spindle 24. In the shown example, the movable pin plate 78 is a generally flat plate extending in a transverse direction to the axis 28. The movable pin plate 78 includes a pin 80, and the location of the pin 80 with respect to the axis 28 is identical to the location of the first pin aperture 68 and the second pin aperture 76. In the described pin arrangement, the pin 80 can cooperate with the first pin aperture 68 and the second pin aperture 76. In one example, the pin 80 is selectively passed through the first pin aperture 68 and the second pin aperture 76 to prevent rotation of the mounting plate 54 and the retaining plate 70 with respect to axis 28. It is to be understood that any number and arrangement of pins 80 can be present with the understanding that the pins 80 are aligned with and designed to pass through the first pin aperture 68 and the second pin aperture 76.

The movable pin plate 78 defines a central bore 84 which is centered about the axis 28. At least a portion of an inside diameter of the central bore 84 is configured to correspond with the bearing surface of the cylindrical appendage 60 on the mounting plate 54. In this arrangement, the movable pin plate 78 can be selectively moved (e.g., translated) with respect to the mounting plate 54. In one example, the movable pin plate 78 can be moved in a direction parallel to the axis 28 (i.e., the axial direction).

Figure 4:
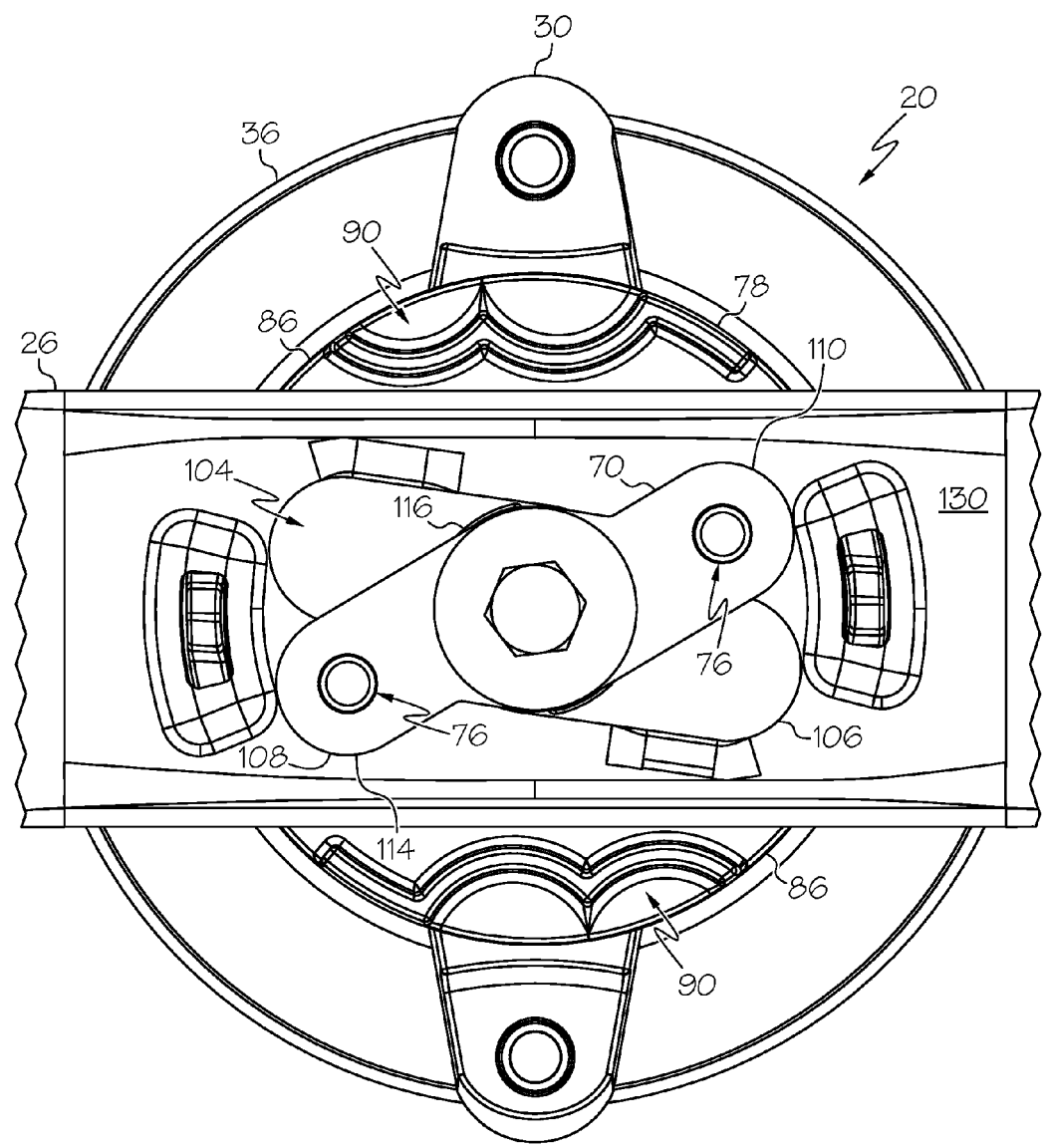
FIG. 4 is a bottom view of the mower blade assembly of FIG. 1 with a movable pin plate in an engaged position.

In one example, the movable pin plate 78 can include a blade contact surface 86 which corresponds to structure defined by the cutting blade 26. In one example, the blade contact surface 86 can be formed by at least one tab 88 extending from the surface of the movable pin plate 78. As will be described below, the blade contact surface 86 can interact with the cutting blade 26 as it is mounted to the mower blade assembly 20. In another example, the movable pin plate 78 can also include a pressure surface 90 configured to be acted upon by an operator as shown in FIG. 4. In one example, an operator can use his or her fingers to move the movable pin plate 78 by applying a force in a direction parallel to axis 28. The pressure surface 90 can be ergonomically designed to correspond to the curves of an operator's finger(s). Returning to FIG. 3, the movable pin plate 78 can further include a cylindrical appendage 92 which is centered about the axis 28 and defines a portion of the central bore 84.

Remaining with FIG. 3, the mower blade assembly 20 further includes a biasing member 98 configured to urge the movable pin plate 78 linearly toward the mounting plate 54. In one example, the biasing member 98 can be a coil spring; however, any suitable biasing member can be used. One part of the biasing member 98 (e.g., a first end of a coil spring) can be positioned against a surface of the movable pin plate 78. Another part of the biasing member 98 (e.g., a second end of a coil spring) can be placed against a surface of the bearing block 30. In one example, the second end of the biasing member 98 can be placed within an aperture 100 defined by the bearing block 30 (best seen in FIG. 2). In another example, the inside diameter of the coil spring can be substantially similar to an outside diameter of the step 94 such that the coil spring is both positively located with respect to the movable pin plate 78 and is prevented from radial deformation during compression and expansion.

The mower blade assembly 20 still further includes one or more of the aforementioned cutting blade 26. The cutting blade 26 is selectively attachable to the mounting plate 54 and the cutting blade 26 defines a third pin aperture 102. The location of the third pin aperture 102 with respect to the axis 28 is identical to the location of the first pin aperture 68, the second pin aperture 76, and the pin 80. In the described pin and pin aperture arrangement, the pin 80 can cooperate with the each of the pin apertures 68, 76, 102. In one example, the pin 80 is selectively passed through the pin apertures 68, 76, 102 to prevent rotation of the mounting plate 54, the retaining plate 70, and the cutting blade 26 with respect to axis 28 as rotational power is transferred from the rotatable spindle 24 to the cutting blade 26 when the movable pin plate 78 is in the engaged position. The pin apertures 68, 76, 102 enable the pin 80 to translate axially (i.e., parallel to the axis 28) to pass at least partially through the mounting plate 54, the cutting blade 26, and the retaining plate 70.

Figure 6:
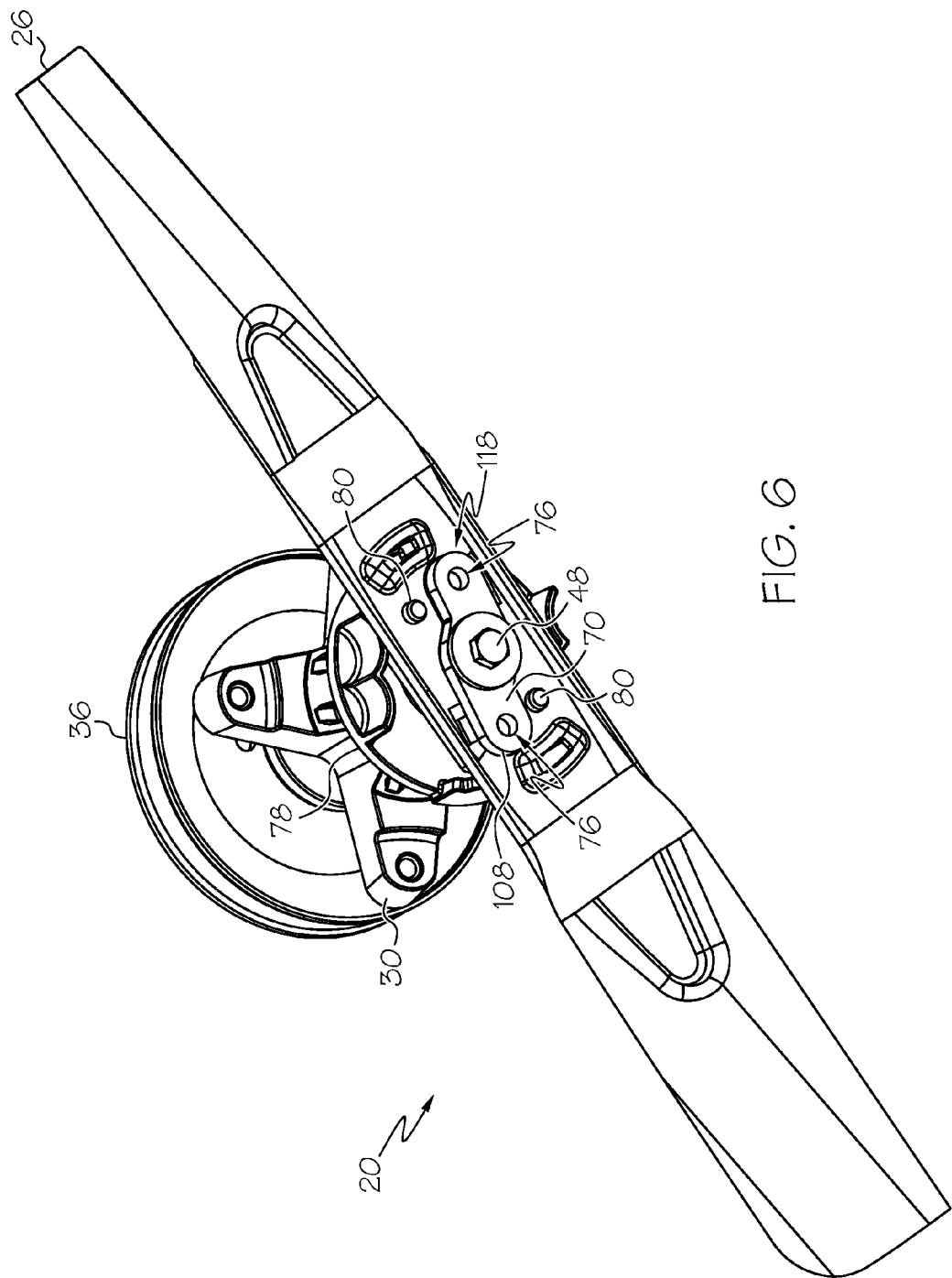
FIG. 6 is a perspective bottom view of the mower blade assembly of FIG. 1 with the cutting blade placed over a retaining plate.

The cutting blade 26 defines a retaining plate aperture 104. A perimeter 106 of the retaining plate aperture 104 can be slightly larger than a perimeter 108 of the retaining plate 70 as shown in FIGS. 4 and 6. The perimeters 106, 108 can be configured such that the retaining plate 70 can pass through the retaining plate aperture 104 defined by the cutting blade 26. This relationship enables the cutting blade 26 to pass over the retaining plate 70 such that a portion of the rotatable spindle 24 passes through the cutting blade 26 at the retaining plate aperture 104.

It is to be understood that the retaining plate aperture 104 and the third pin aperture 102 can be used as mounting orientation features so that the cutting blade 26 can be mounted in only one orientation relative to the mower blade assembly 20. For example, the configuration of the retaining plate 70 and the corresponding retaining plate aperture 104 can be oriented to enable the cutting blade 26 to be mounted and retained on the mounting plate 54 in a particular orientation. As shown in FIG. 4, the retaining plate 70 can include a first arm 110 and a second arm 114 extending from a central portion 116. The arms 110, 114 can be offset from a center line of the central portion 116. This offset can prevent the cutting blade 26 from being mounted or attached to the mower blade assembly 20 while upside-down. As can be seen in FIG. 1, the cutting blade 26 is normally mounted to the mower blade assembly with a bottom surface 130 facing downward such that a cutting edge 120 is lower than a ramped surface 124 on the cutting blade 26. However, if an operator attempts to mount the cutting blade 26 with the bottom surface 130 facing upward, the perimeter 106 of the retaining plate aperture 104 will not align with the perimeter 108 of the retaining plate 70 due to the described offset. Thus, the cutting blade 26 cannot be placed over the retaining plate 70, and the cutting blade 26 cannot be mounted or retained by the mower blade assembly 20.

In one example, the cutting blade 26 can be configured with the previously described sharpened cutting edge 120. In one example, the sharpened cutting edge 120 can be two inches to six inches in length. The cutting blade 26 can incorporate an offset so that the cutting edge 120 is closer to the grass (ground plane) than a center section 122 in order to improve efficiency and cut quality. The side of the cutting blade 26 opposite the cutting edge 120 may incorporate the ramped surface 124 as a sail that produces higher pressure above and lower pressure below the rotating cutting blade 26 so as to effectively create lift of the grass and clippings. In one example, the cutting end of the blade can be configured with pivot means, with filament (string) retention means, or with shapes primarily intended to move air (paddle blades).

Figure 5:
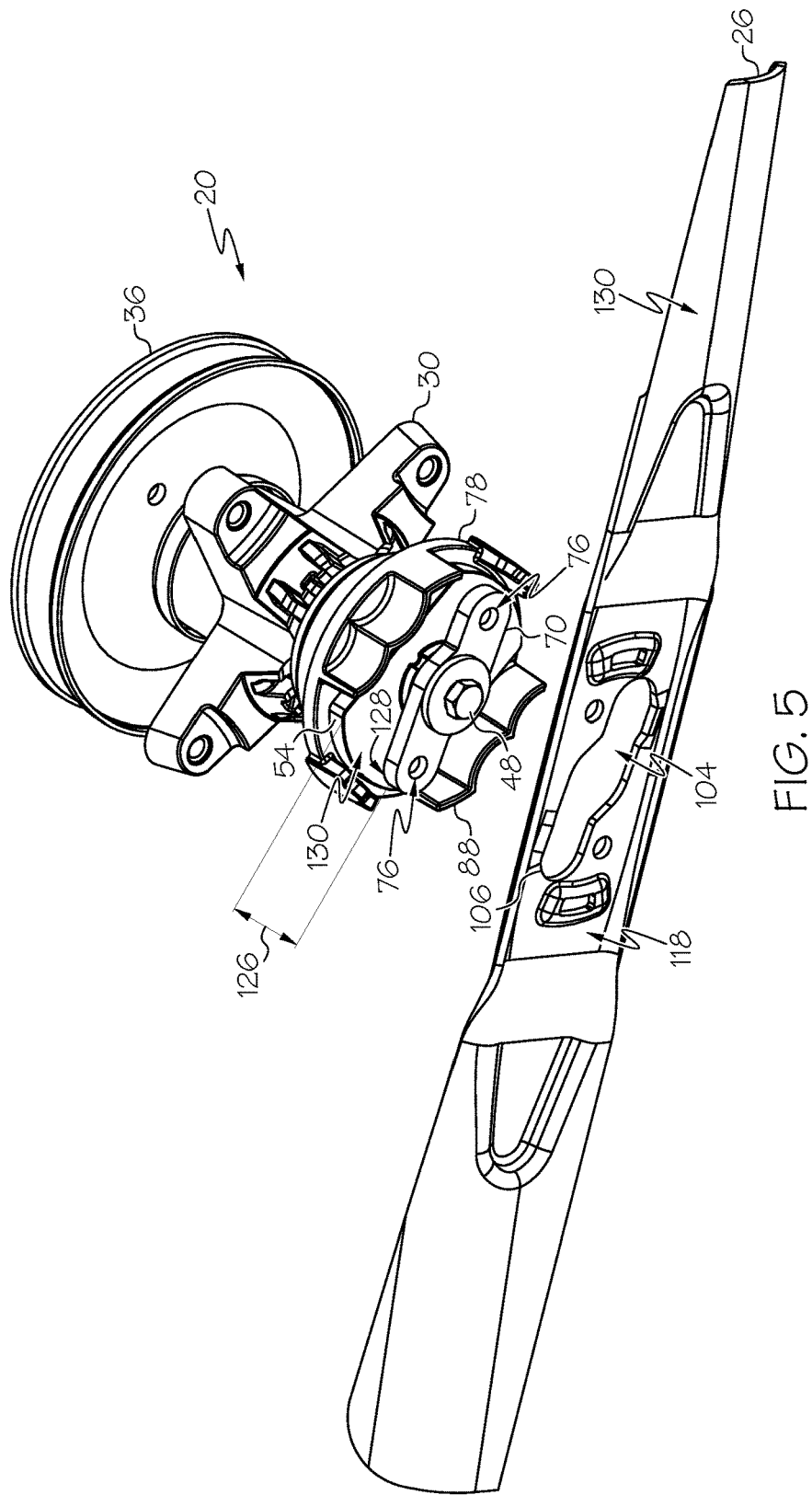
FIG. 5 is a perspective bottom view of the mower blade assembly of FIG. 1 with a cutting blade removed from the remainder of the mower blade assembly.

The cutting blade 26 can be selectively mounted and retained between the mounting plate 54 and the retaining plate 70 by at least one method which is presently described. Turning to FIG. 5, the cutting blade 26 can be moved to a position beneath the mower blade assembly 20, and the cutting blade 26 is rotated such that the perimeter of the retaining plate aperture 104 is aligned with the retaining plate 70. As shown in FIG. 6, the cutting blade 26 is then placed onto the rotatable spindle 24 by urging or moving the cutting blade 26 over the retaining plate 70 such that the retaining plate 70 at least partially passes through the retaining plate aperture 104. As shown in FIG. 5, the retaining plate 70 is mounted to the rotatable spindle 24 such that there is a gap 126 between an upper surface 128 of the retaining plate 70 and a bottom surface 118 of the mounting plate 54. A portion of the cutting blade 26 will be placed in this gap 126. However, the movable pin plate 78 initially provides a physical interference to placing the cutting blade 26 in the desired position to operatively mount and retain the cutting blade 26 to the mower blade assembly 20.

Figure 7:
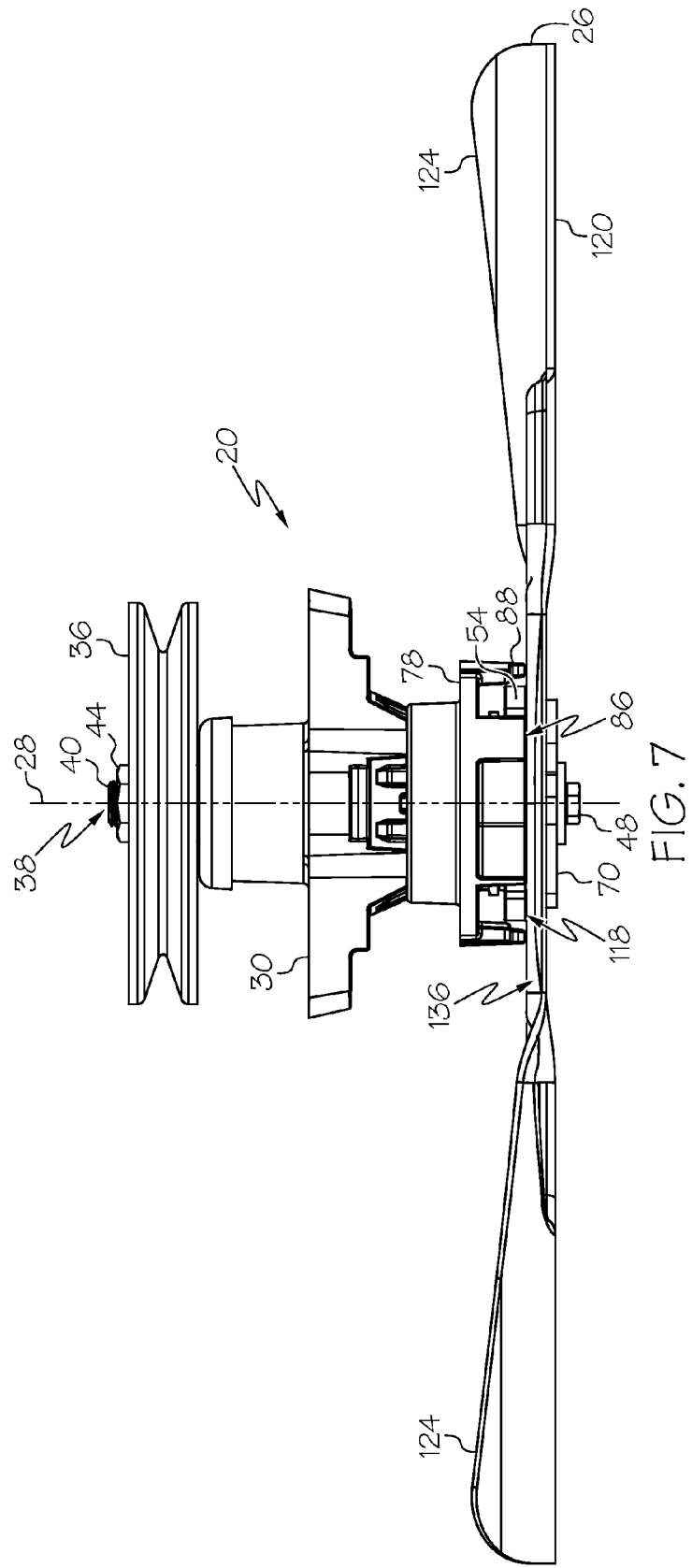
FIG. 7 is an elevation view similar to FIG. 6, showing the cutting blade urging the movable pin plate to a disengaged position.

Turning to FIG. 7, as the cutting blade 26 is urged toward the bearing block 30 (i.e., axially upward), the blade contact surface 86 can interact with the cutting blade 26 and urge the movable pin plate 78 axially upward to temporarily move the physical interference. For example, the blade contact surface 86 is moved into contact with tab 88 located on the movable pin plate 78. As the cutting blade 26 is further urged axially upward, contact between the two objects transmits an upward vertical force urging the movable pin plate 78 axially upward to the disengaged position, thereby compressing the biasing member 98 (e.g., the coil spring shown in FIG. 2). In another example, the operator may also use one of his or her hands to move the movable pin plate 78 axially upward. Regardless of the method used to translate the movable pin plate 78 axially upward, the movable pin plate 78 is eventually placed in a disengaged position as shown in FIG. 7.

The disengaged position includes the movable pin plate 78 being in a position such that the pin 80 is at an elevation where it is disengaged from the second pin aperture 76 of the retaining plate 70. Furthermore, the disengaged position requires that no portion of the pin 80 is located within the gap 126, and, in fact, the end of the pin 80 is at least at the elevation of the bottom surface 118 of the mounting plate 54, if not higher. The disengaged position further includes a thickness of the cutting blade 26 at the center section 122 being vertically aligned with the gap 126 (best seen in FIG. 5). This alignment places the cutting blade 26 at an elevation such that the bottom surface 130 of the cutting blade 26 is at or slightly above an elevation of the upper surface 128 of the retaining plate 70. In some examples, the movable pin plate 78 can be pushed against a hard stop to serve as an indication to the operator that the movable pin plate 78 is in the disengaged position.

Returning to FIG. 6, because the elevation of the bottom surface 130 of the cutting blade 26 is at or slightly above the elevation of the upper surface 128 of the retaining plate 70 (best seen in FIG. 3), and the pin 80 is removed from the gap 126, the cutting blade 26 is free to rotate into position to be mounted and retained securely on the mower blade assembly 20.

The method then includes the step of rotating the cutting blade 26 to align the pin 80 with the third pin aperture 102. During the rotation step, the cutting blade 26 slides along the contact surface 86 on the tab 88 until the pin 80 is aligned with the third pin aperture 102. When the pin 80 is aligned with the third pin aperture 102, the biasing member 98 urges the movable pin plate 78 downward and the tab 88 slides down a side 136 of the cutting blade 26. In one example, the biasing member 98 urges the movable pin plate 78 to "snap" into place (i.e., the engaged position), thus giving the operator a clear physical and aural indication that the cutting blade 26 is securely mounted and secured to the mower blade assembly 20. Alignment of the pin 80 with the pin apertures 68, 76, 102 releases the movable pin plate 78 such that the biasing member 98 urges the movable pin plate 78 axially downward to engage the pin 80 with the pin apertures 68, 76, 102.

As the cutting blade 26 is rotated, the retaining plate aperture 104 no longer aligns with the perimeter 108 of the retaining plate 70. This provides physical interference preventing downward vertical motion of the cutting blade 26 which may otherwise remove the cutting blade 26 from the mower blade assembly 20. As such, the cutting blade 26 is mounted and retained to the mounting plate 54 and the remainder of the mower blade assembly 20.

As the tab 88 slides down the side 136 of the cutting blade 26, the movable pin plate 78 moves from the disengaged position to an engaged position such that the pin 80 is operatively engaged with the first pin aperture 68, the second pin aperture 76, and the third pin aperture 102 for operatively mounting and retaining the cutting blade 26 to the mounting plate 54 and the remainder of the mower blade assembly 20. The pin 80 and, in some examples the tab 88, securely mounts the cutting blade 26 to the rotatable spindle 24 such that rotational motion of the rotatable spindle 24 results in rotational motion of the cutting blade 26. When in the engaged position, the movable pin plate 78 prevents lateral motion of the cutting blade 26 relative to the mounting plate 54. Additionally, the pin 80 prevents rotation of the cutting blade 26 relative to the retaining plate 70 when the movable pin plate 78 is in the engaged position. It is to be understood that the pin 80 location passing through the first pin aperture 68, second pin aperture 76, and the third pin aperture 102 necessarily places the pin 80 into a "double shear" orientation while the blade is spinning.

Figure 10:
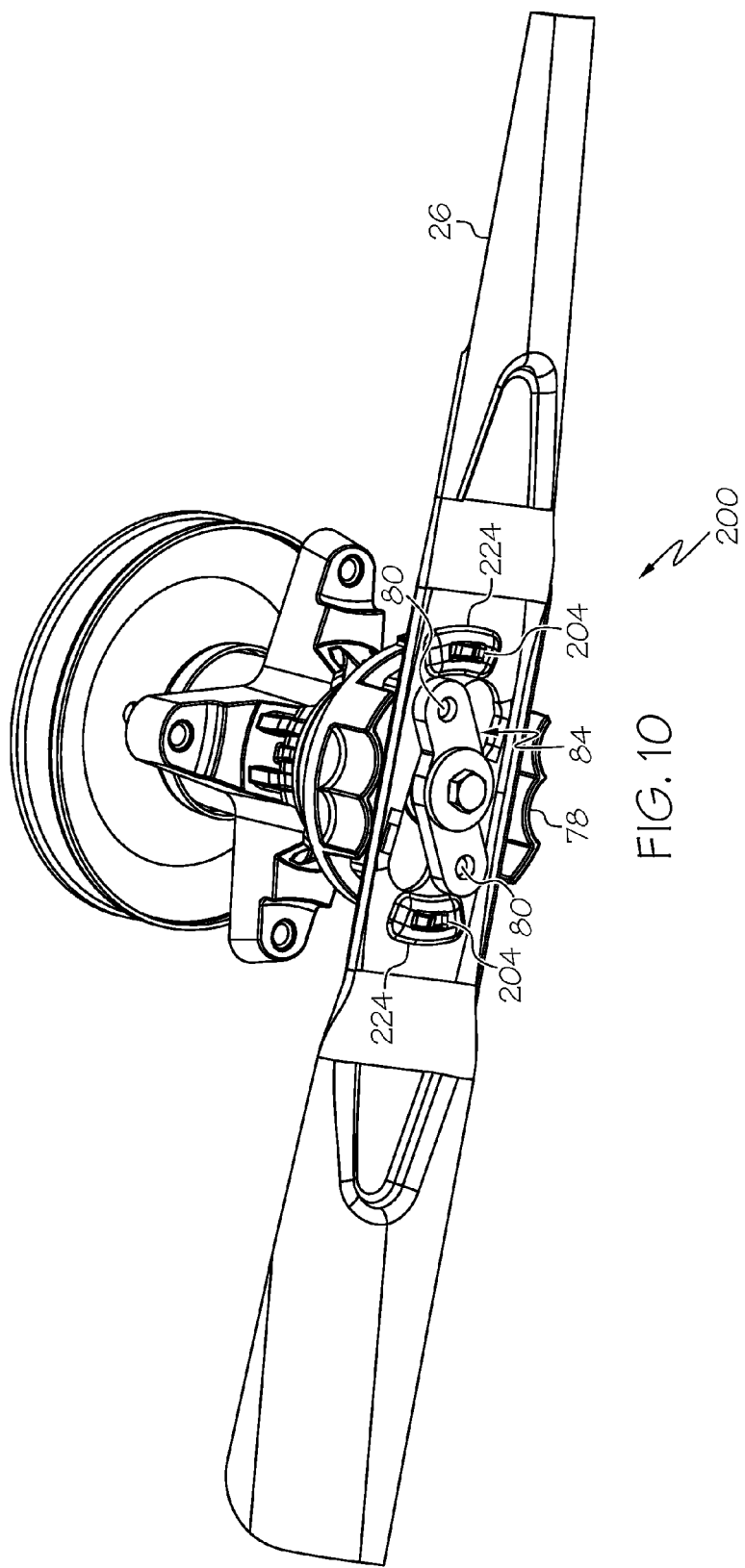
FIG. 10 is a perspective view of another embodiment of an example mower blade assembly having a force finger.
Figure 11:
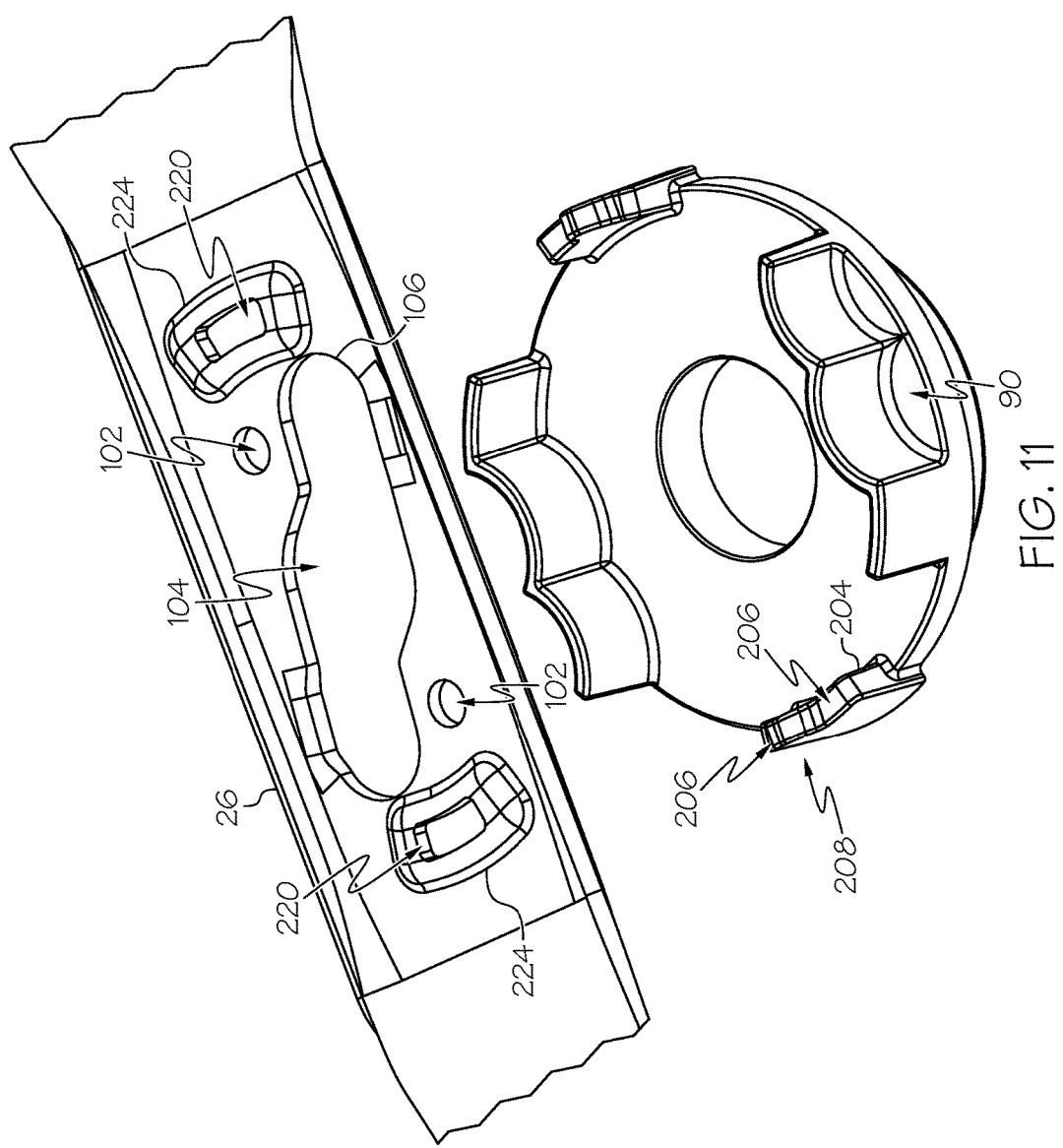
FIG. 11 is a detail view of a force finger on a movable plate.
Figure 12:
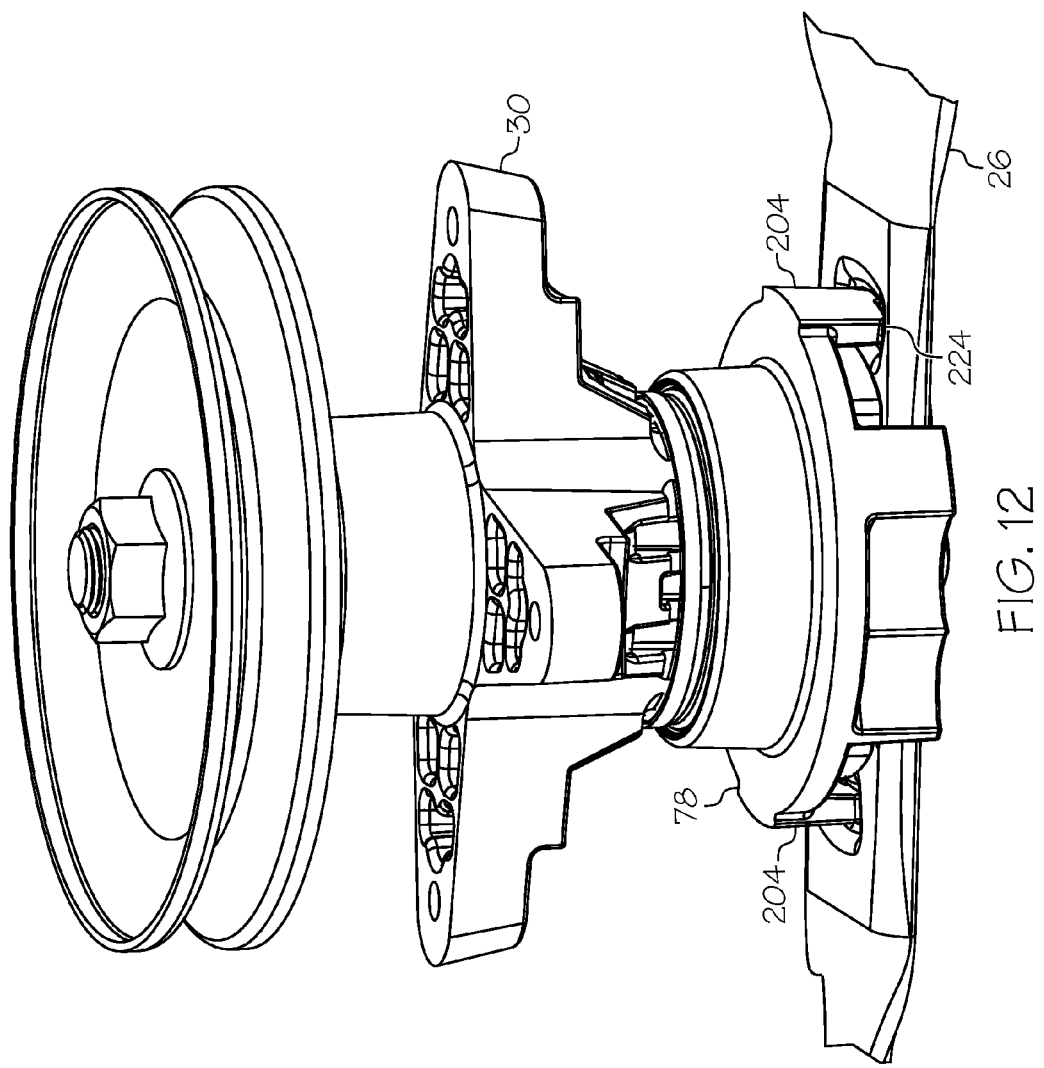
FIG. 12 is an elevation cross-section view of the embodiment of FIG. 10.
Figure 13:
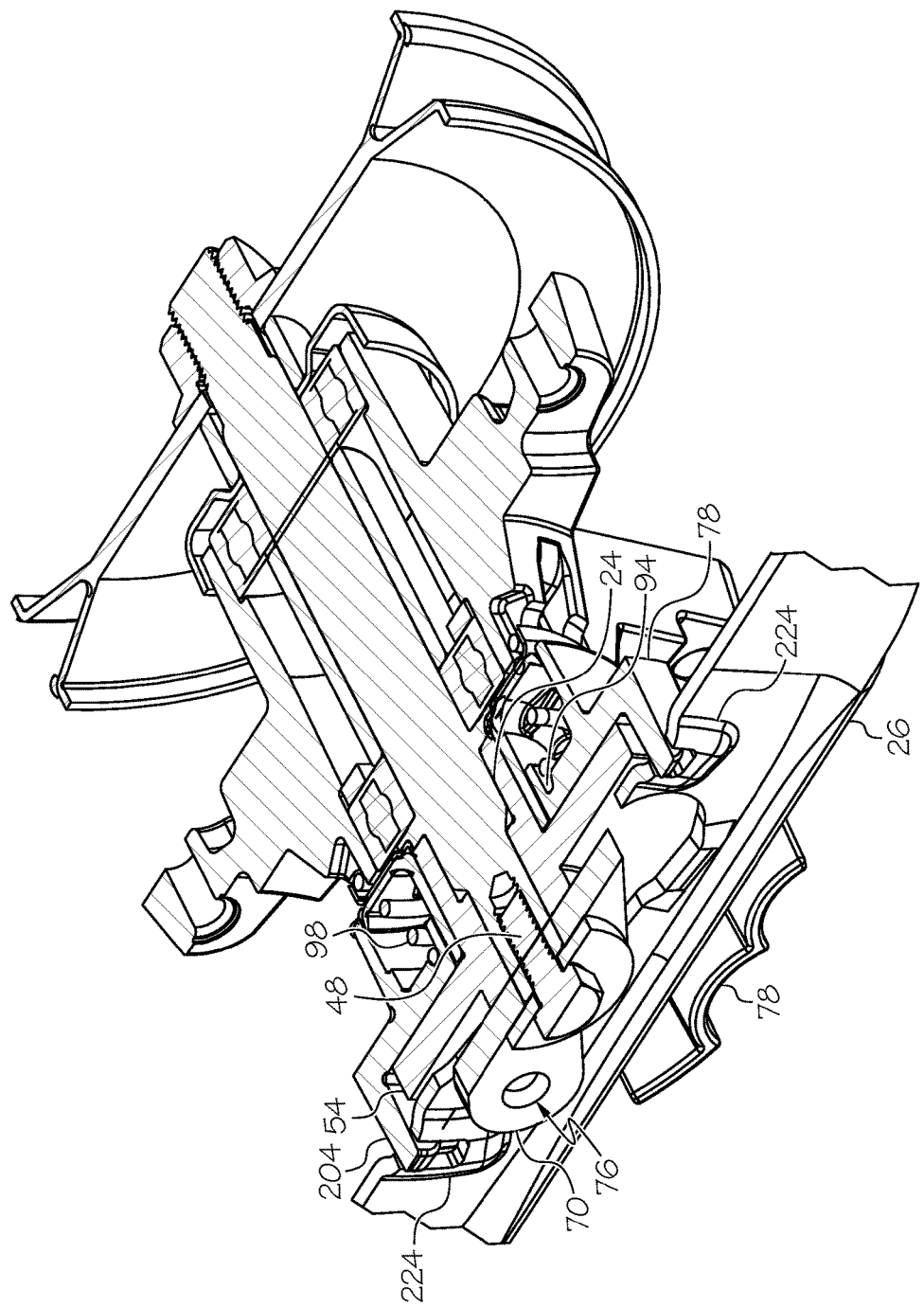
FIG. 13 is a perspective view of the mower blade assembly of FIG. 10.

Turning to FIG. 10, a second embodiment of the mower blade assembly 200 is shown. In this embodiment, the movable pin plate 78 also includes a force finger 204. In this example the force finger 204 extends away from the movable pin plate 78 in a direction parallel to the vertical rotational axis 28, which can also be termed a downward direction. The example shows two force fingers 204, however, other quantities are contemplated. Each of the force fingers 204 are located a distance away from the pin 80 and the central bore 84, and the force fingers 204 can be located generally along a centerline of the cutting blade 26. Turning to the detail view in FIG. 11, each force finger 204 can include a shoulder 206 on at least one side of the force finger 204. As such, the force finger 204 can include a distal end 208 and a contact surface 210.

Remaining at FIG. 10, the cutting blade 26 further defines a force finger aperture 220. As shown in the example, the number of force finger apertures 220 corresponds to the number of force fingers 204 located on the movable pin plate 78 as previously described. The force finger apertures 220 can be located generally along a centerline of the cutting blade 26. Each force finger aperture 220 is configured to receive a portion of the force finger 204 as the cutting blade 26 is mounted to the mower blade assembly 20. Furthermore, the force finger aperture 220 can be located in a localized indentation 224 on the cutting blade 26 as shown in FIG. 10.

Additionally, as the movable pin plate 78 moves from the disengaged position to an engaged position, at least a portion of the force finger 204 passes through the force finger aperture 220. In one example, as shown in FIG. 10, the distal end 208 of the force finger 204 passes through the force finger aperture 220. When the movable pin plate 78 is in the engaged position, the shoulder 206 is in contact with the upper side of the cutting blade 26. The biasing member 98 continues to exert downward force even when the movable pin plate 78 is in the engaged position, thus putting a downward force on the cutting blade 26 through the shoulder 206 on the force finger 204. This downward force can be beneficial in a number of ways. In one example, this downward force applied to the cutting blade 26 by the shoulders 206 can help to reduce stack-up tolerances in the mower blade assembly 20. In another example, the downward force can help reduce and/or eliminate any wobble of the cutting blade 26 after the movable pin plate 78 is placed in the engaged position.

Even without the downward force described above, the force fingers 204 extending through the force finger apertures 220 can provide other benefits including, but not limited to, an indexing feature to limit the number of ways the cutting blade 26 can be installed on the mower blade assembly 20; and serving as a tactile and/or visual confirmation that the movable pin plate 78 is in the engaged position, and the cutting blade 26 is firmly attached to the mower blade assembly 20.

It is to be understood that the elevations of the pin 80, the force finger 204, and the shoulder 206 can be calculated and manufactured such that if the force finger 204 does not pass through the force finger aperture 220, the pin 80 will not fully pass through one or more of the first pin aperture 68, the second pin aperture 76, and the third pin aperture 102. In this way, the described arrangement of the force finger 204 and the force finger aperture 220 can also beneficially help ensure the proper selection of cutting blade 26 has been made and that the cutting blade 26 is properly attached.

Figure 14:
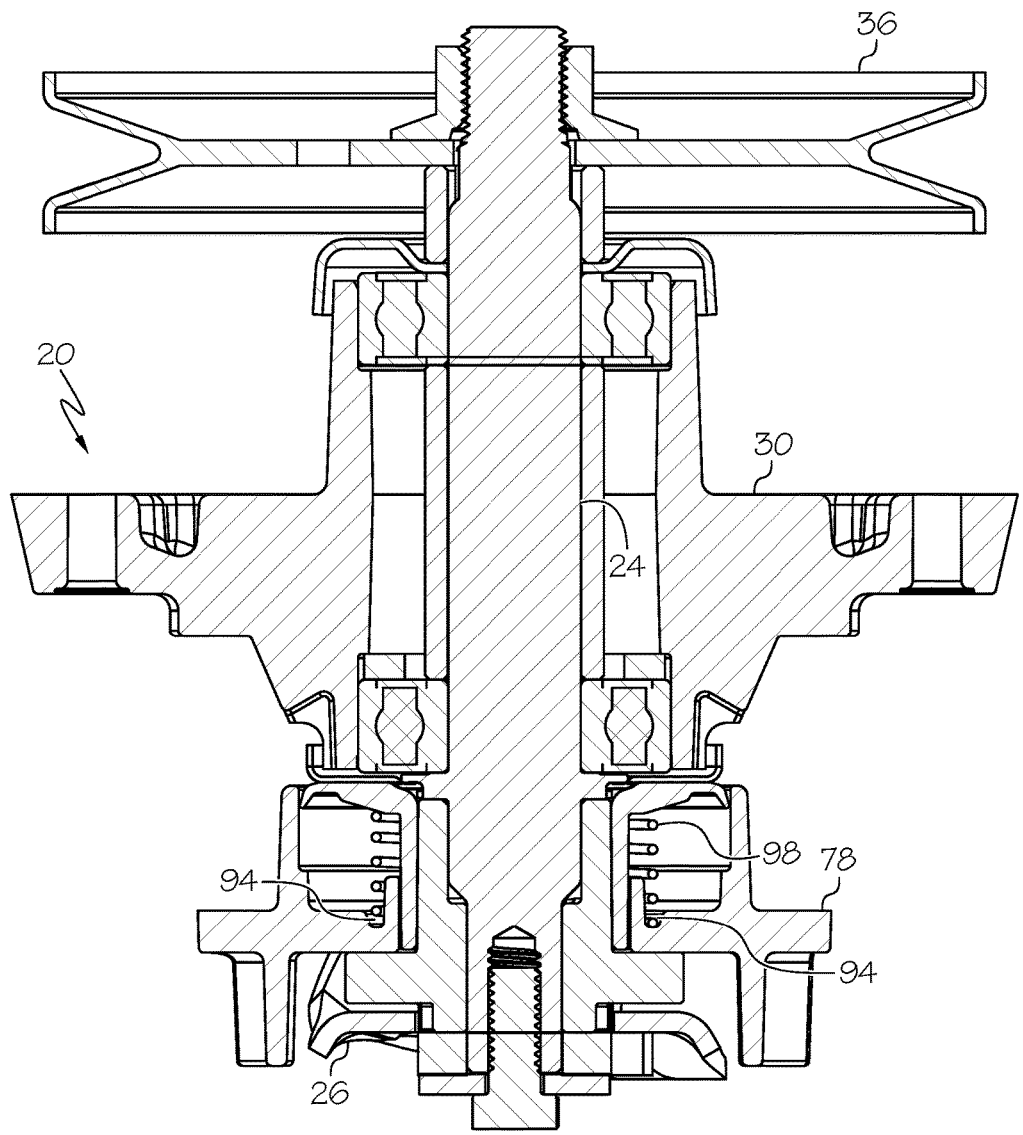
FIG. 14 is a cross-section view of the embodiment of FIG. 10, showing an assembly for a riding mower.
Figure 15:
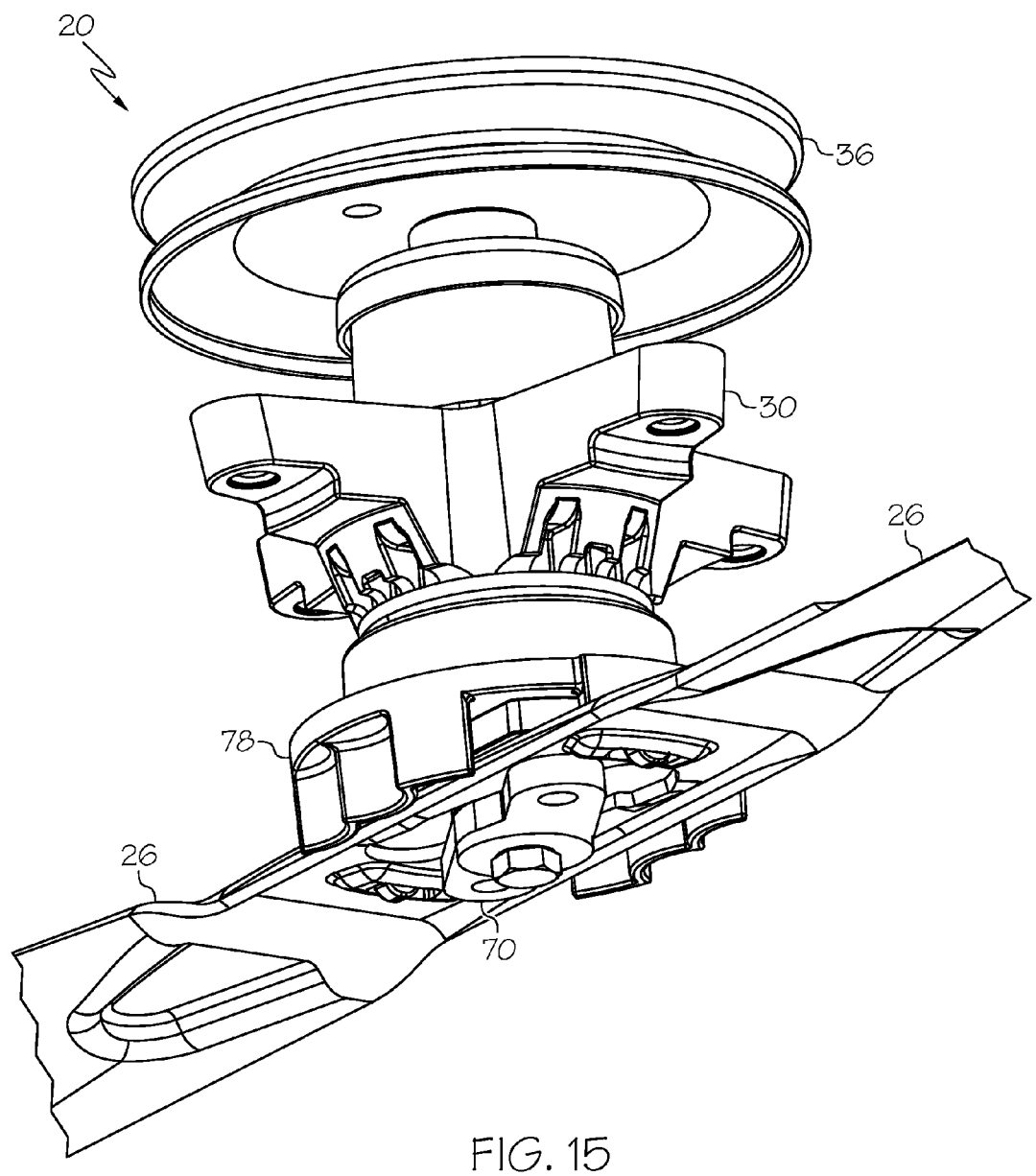
FIG. 15 is a perspective view of the assembly of FIG. 14.
Figure 16:
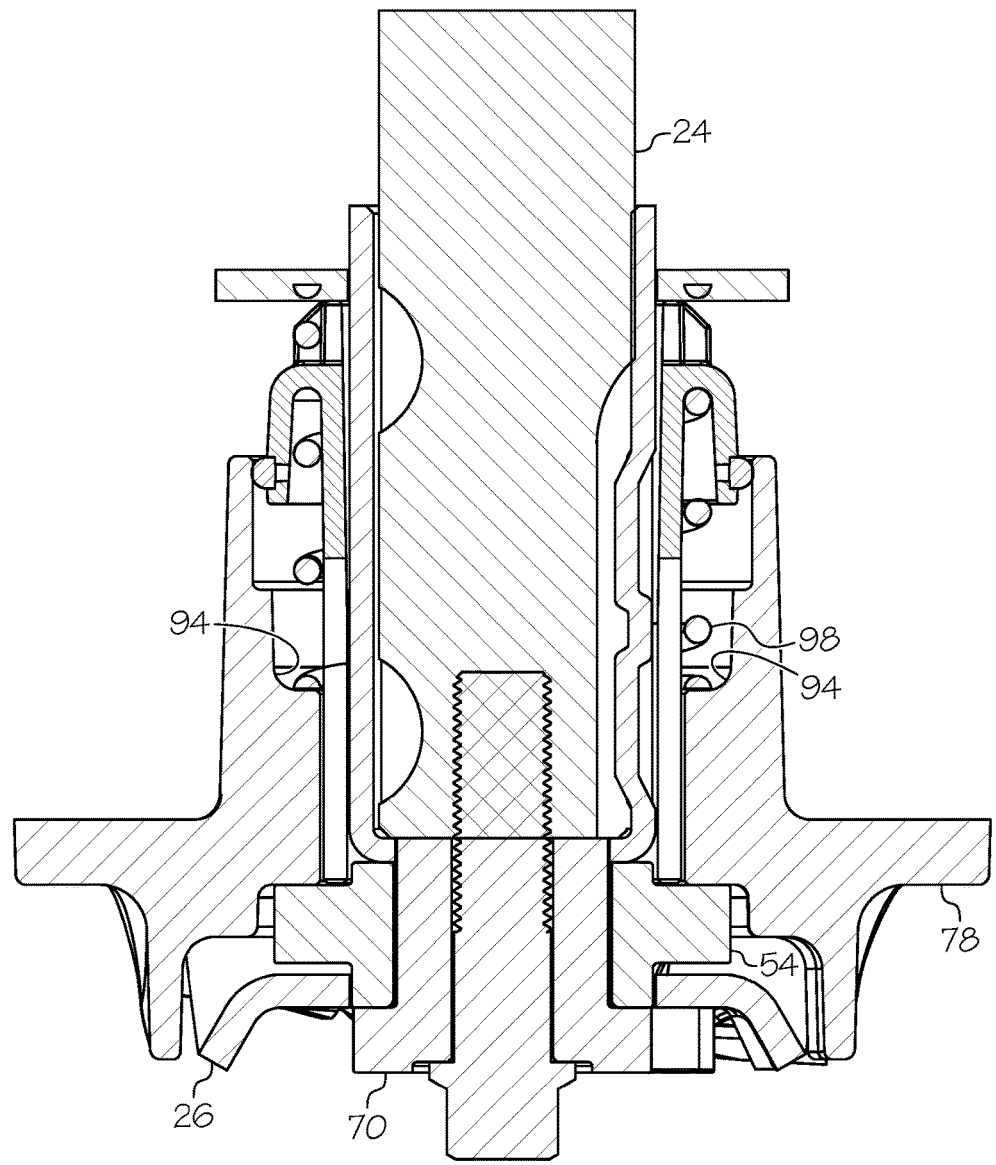
FIG. 16 is a cross-section view of the embodiment of FIG. 10, showing an assembly for a walk-behind mower.
Figure 17:
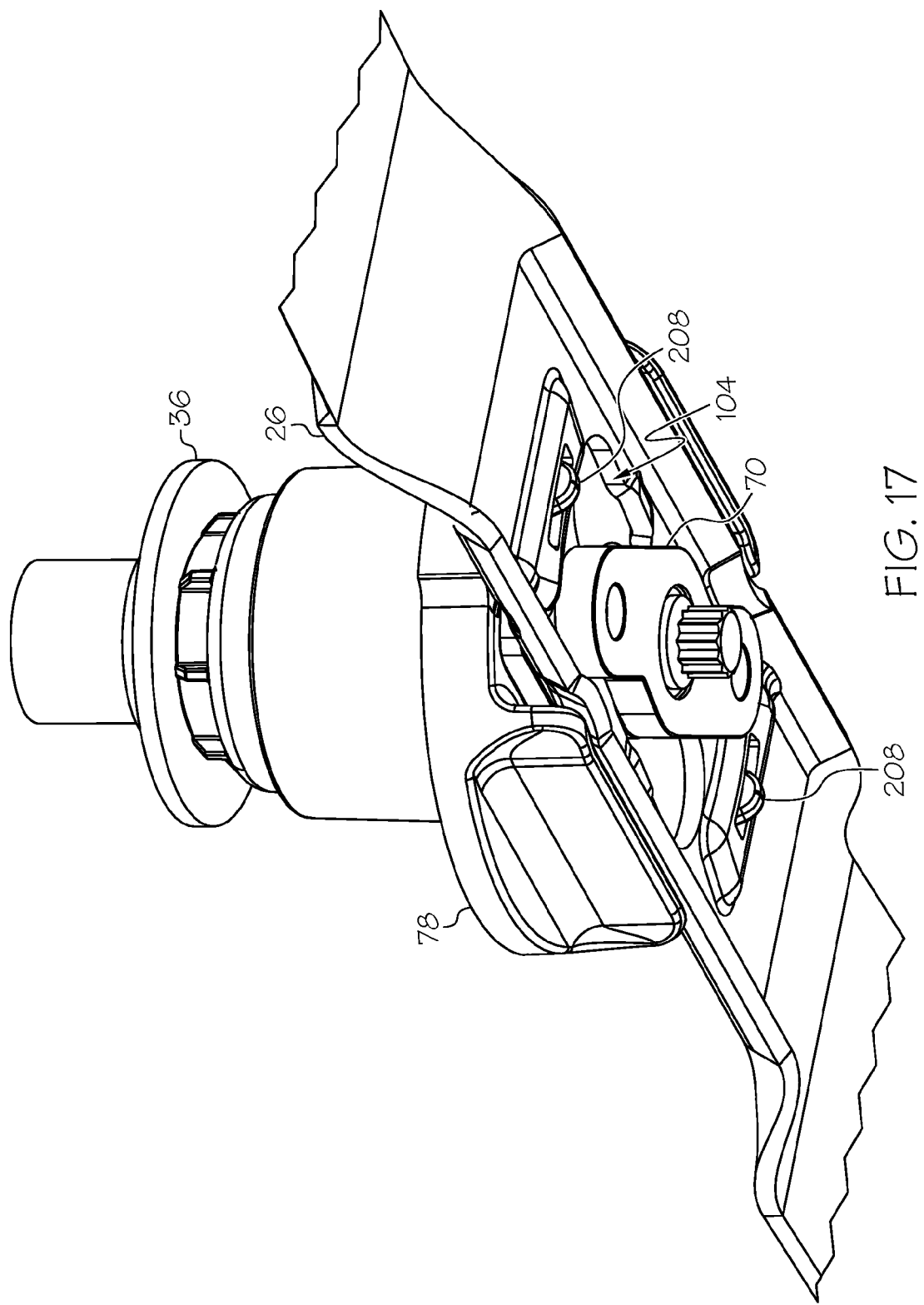
FIG. 17 is a perspective view of the assembly of FIG. 16.

It is also to be understood that the second embodiment as represented in FIGS. 10-13 can vary for differing types of lawn maintenance tools. For example, the cross-section view and perspective view of FIGS. 14-15 represent structure used for rider mowers. The cross-section view and perspective view of FIGS. 16-17 represent structure used for walk-behind mowers. It is to be understood that the height envelope underneath the mowing deck (not shown) of the rider mower in comparison to the walk behind mower can be different, and the shown structure can be modified to accommodate the height envelope of either style of lawn mower or lawn maintenance vehicle. Furthermore, either embodiment described in this disclosure can be used with rider mowers and walk behind mowers.

Figure 8:
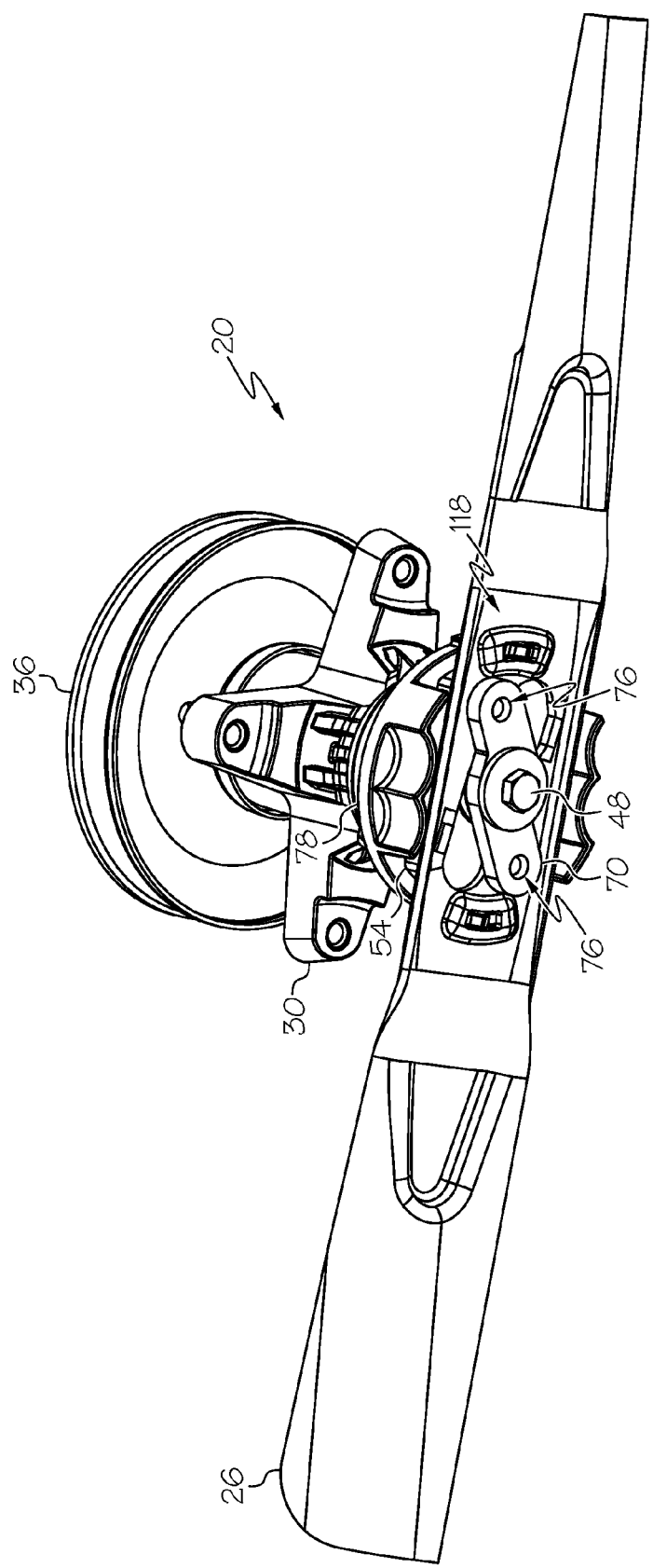
FIG. 8 is a perspective bottom view of the mower blade assembly of FIG. 1 with the movable pin plate in the engaged position and the cutting blade.
Figure 9:
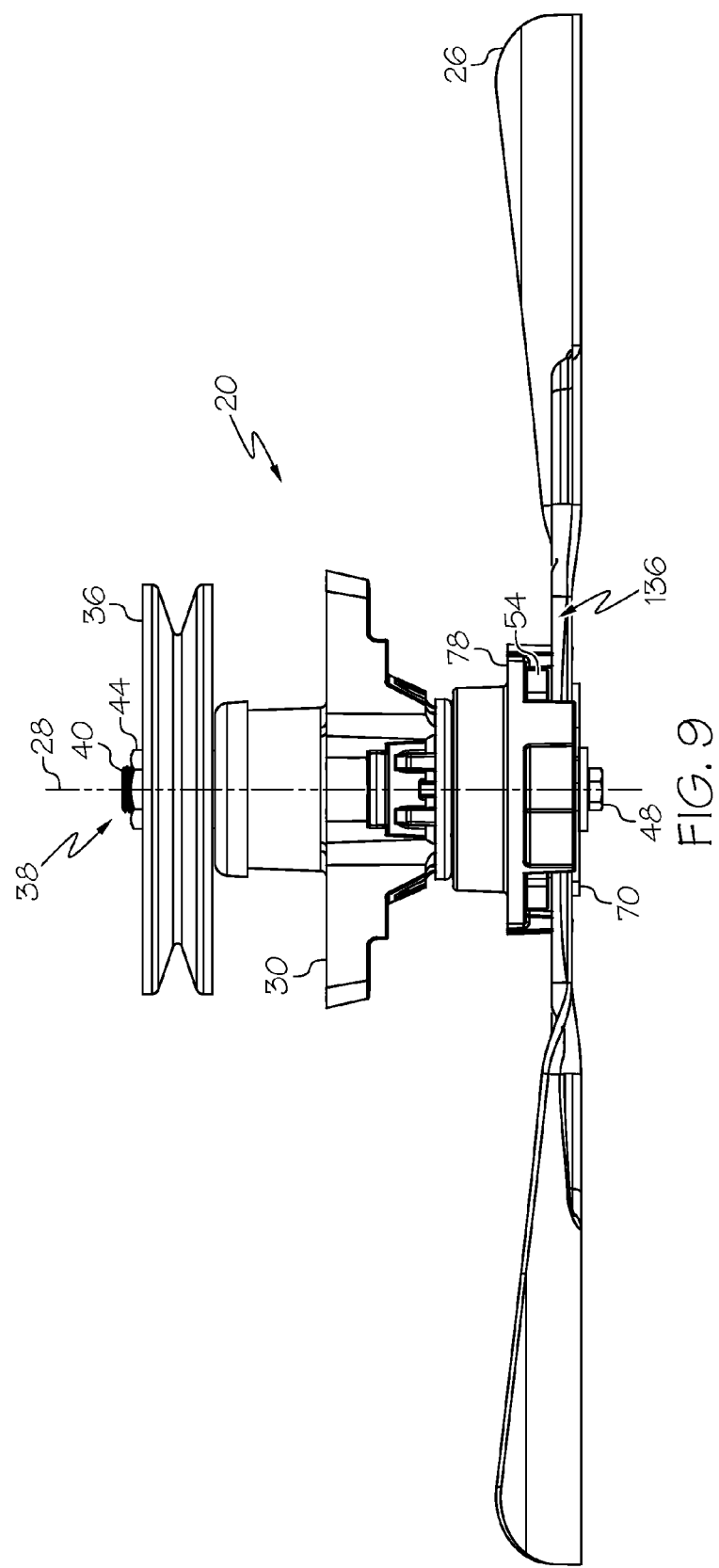
FIG. 9 is an elevation view similar to FIG. 7, showing the movable pin plate in the engaged position and the cutting blade mounted and retained on the mower blade assembly.

Turning to FIG. 8, when the movable pin plate 78 is in the engaged position, locations of said second pin aperture 76 and said third pin aperture 102 are positioned such that the perimeter of the retaining plate 70 is not aligned with the retaining plate aperture 104 when the pin 80 is engaged with the pin apertures 68, 76, 102. In the engaged position, the retaining plate 70 cannot pass through the retaining plate aperture 104 as shown in FIG. 8. Additionally, the biasing member 98 urges the movable pin plate 78 linearly toward the mounting plate 54 to sandwich the cutting blade between the mounting plate 54 and the retaining plate 70 and maintain the axial force in the sandwich effect. This sandwich arrangement prevents vertical motion of the cutting blade 26 relative to the mounting plate 54. This sandwich position is best seen in the side view of FIG. 9.

In more simple terms, the cutting blade 26 can be applied to a mowing device by simply: 1) aligning the retaining plate aperture 104 in the cutting blade 26 with the retaining plate 70, 2) pushing upward, and then 3) rotating the cutting blade 26 until the movable pin plate 78 snaps into position.

In yet another description, the method of attaching the cutting blade 26 can be described as including the following steps. First, providing a mower blade assembly 20 including a movable pin plate 78. The method continues with the step of moving the cutting blade 26 to contact a portion of the mower blade assembly 20. The method then includes the step of urging the movable pin plate 78 to a disengaged position. The method also includes the step of rotating the cutting blade 26. The rotation can be generally about the central axis 28. The method further includes the step of releasing the movable pin plate 78 such that the movable pin plate 78 returns to an engaged position for operatively mounting and retaining the cutting blade 26 to the rotatable spindle 24, motor, or engine crankshaft.

From time to time, it may be advantageous to remove the cutting blade 26 from the mower blade assembly 20, such as for sharpening, etc. In such an instance, the operator can urge the movable pin plate 78 axially upward to the disengaged position. In the disengaged position, the pin 80 is removed from engagement with the second pin aperture 76 and the third pin aperture 102 to enable rotation of the cutting blade 26 relative to the retaining plate 70. The operator then rotates the cutting blade 26 until the retaining plate aperture 104 is aligned with the perimeter of the retaining plate 70. The operator can then slide the cutting blade 26 downward and away from the remainder of the mower blade assembly 20.

Figure 18:
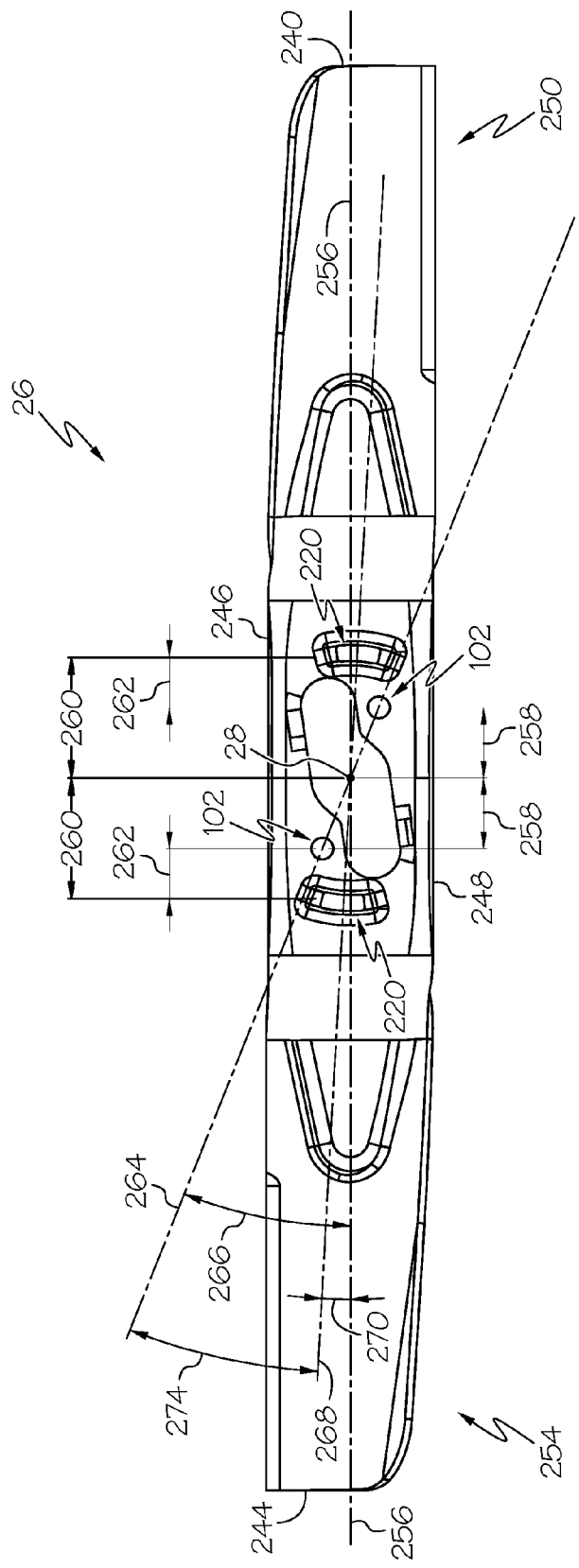
FIG. 18 is a top view of a cutting blade to be used in the mower blade assembly of FIG. 1, 10, or 16.

A description of an example cutting blade 26 follows. Turning to FIG. 18, the cutting blade 26 is an elongate blade 26 having opposed end edges 240, 244 and opposed side edges 246, 248. The cutting blade 26 is adapted for mounting onto a rotary mower (not shown) for rotation about a central axis 28, represented by a dot in FIG. 18. The central axis 28 extends transverse to the elongate blade 26 and separates the elongate blade 26 into opposed elongate end portions 250, 254 that are extended from the central axis 28. Additionally, the elongate blade 26 has a blade major axis 256.

As previously described, the elongate blade 26 defines a third pin aperture 102 positioned a distance 258 from the central axis 28. The elongate blade 26 also defines a force finger aperture 220 positioned a distance 260 from the central axis 28 and a distance 262 away from the third pin aperture 102. In the shown example of FIG. 18, the elongate blade 26 defines two third pin apertures 102 and two force finger apertures 220.

The third pin apertures 102 and the force finger apertures 220 can be located in any number of patterns. In the shown example, the third pin apertures 102 are located on a pin line 264 that is not parallel to the blade major axis 256. Furthermore, the pin line 264 passes through the central axis 28 and is radially offset at an angle 266 to the blade major axis 256. Similarly, the force finger apertures 220 are located on a finger line 268 that is not parallel to the blade major axis 256 and the finger line 268 can pass through the central axis 28 and be radially offset at an angle 270 to the blade major axis 256. In one example, the pin line 264 and the finger line 268 can be radially offset from each other at an angle 274.

Figure 19:
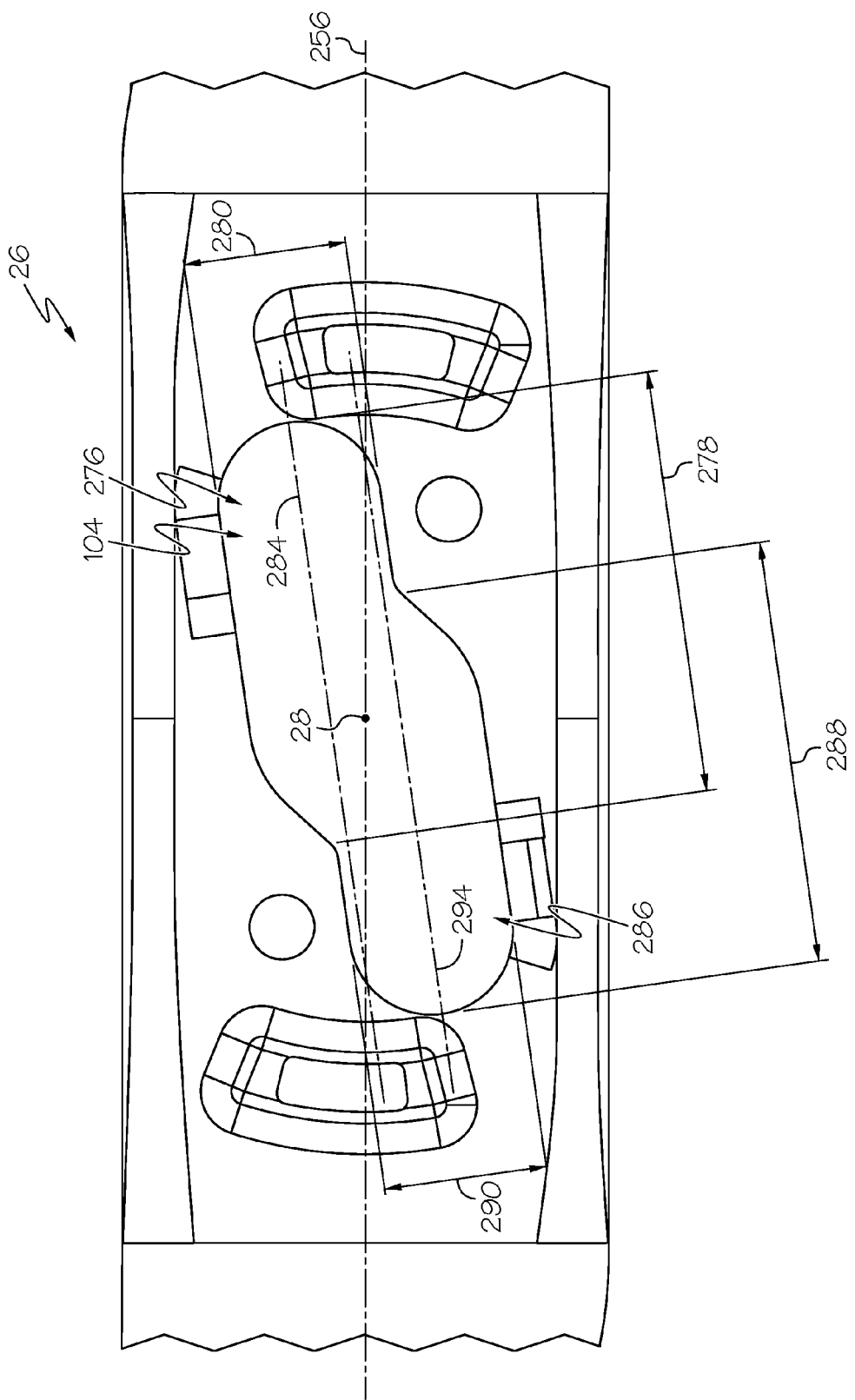
FIG. 19 is a detail view of a retaining plate aperture of the blade of FIG. 18.

Turning to FIG. 19, and as described previously, the cutting blade 26 further defines the retaining plate aperture 104 that can be centrally located and is asymmetric about the central axis 28. Any number of suitable shapes or profiles can be used for the retaining plate aperture 104, so long as the retaining plate aperture 104 and the retaining plate 70 cooperate with one another, allowing the retaining plate 70 to pass through the retaining plate aperture 104 as needed. In the shown example, the retaining plate aperture 104 can be defined by a first stadium-shaped portion 276. For convenience, this disclosure will use the term stadium or stadium-shaped, however, this shape can also be named generally ovoid, obround, or any number of other descriptive terms. The first stadium-shaped portion 276 has a long dimension 278, a short dimension 280 and a first centerline 284 along its long dimension 278. The retaining plate aperture is further defined by a second stadium-shaped portion 286 that partially intersects or overlaps the first-stadium-shaped portion 276. Similarly, the second stadium-shaped portion 286 has a long dimension 288, a short dimension 290 and a second centerline 294 along its long dimension 288. The first and second centerlines 284, 294 are offset from one another along a direction substantially perpendicular to the direction of the first centerline 284 and said second centerline 294.

As shown in FIG. 19, the first stadium-shaped portion 276 and the second stadium-shaped portion 286 are offset from each other along the blade major axis 256 and a lateral dimension 296 of the cutting blade 26. In this example, the second stadium-shaped portion 286 partially intersects or overlaps the first stadium-shaped portion 276 at a generally center portion of the cutting blade 26.

The described combination of components can provide many advantages. In one example, the described apparatus and method can provide a tool-less way to install, retain, and remove a lawn mower blade. Additionally, the retaining method and apparatus can provide a positive indication that the blade(s) is installed and locked in its proper location. Furthermore, the method can take far less time than a standard blade removal requiring a hand tool to install or remove a mowing blade. Additionally, the described apparatus and method can enable an operator to change a mower blade with one hand.

The disclosure can also provide a changeable-mowing blade assembly that minimizes lateral and radial movement of the cutting blade so as to produce high quality finish-cuts on a variety of grasses. In another example, the disclosed apparatus and methods can provide a mowing blade assembly that retains the blade during impact with objects such as those that would be considered equivalent to the American National Standards Institute (ANSI) "stake" test.

In some instances, it is beneficial to collect material cut by the cutting blade. In these instances, the blade(s) can be changed for a cutting blade with increased "lift", or additional blades could be added to the center section. Extra lift and air/debris flow can be provided to elevate the grasses, leaves, and debris into the upper areas of the mower deck housing, and then provide the increased air pressures and centrifugal forces necessary to encourage the suspended material to enter the material collection means.

For mulching purposes, different cutting blade configurations (generally those creating additional turbulence), or additional cutting blades can be added to the blade center section. The changeable-blades provide for many configurations that increase turbulence within the mower deck housing. Additional blades also provide increased cutting surfaces that secondarily cut the grasses and leaves thereby making the particles smaller for easier assimilation into the uncut grasses. In another example, the changeable-blade can include one side with a trailing edge ramp structure for updraft development, and the other side includes a trailing edge having a mulching structure.

For "rough cut" operations, the blade ends can incorporate pivot means (swing blades) or filament (string) retention means so they can function well in conditions whereby the blades or filament can cut most of what it contacts, but can deform when encountering temporary or permanently non-deformable objects.

For serving as a blower, the blade ends can be shaped like impeller blades such that the air movement into and out of the mower blade housing (cutting deck) is enhanced/increased. This would be useful in clearing walkways, driveways, etc.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A blade for a lawn maintenance device comprising:
a blade having a blade major axis, a second blade axis perpendicular to the blade major axis, and a center axis perpendicular to the blade major axis and the second blade axis;
wherein the blade defines a first aperture that is asymmetric and is centrally located and the first aperture has a first portion and a second portion partially intersecting the first portion, wherein
the first portion has a long dimension, a short dimension and a first centerline along its long dimension, the second portion has a long dimension, a short dimension and a second centerline along its long dimension, and the first and second centerlines are generally parallel to each other, but not parallel to the blade major axis or the second blade axis, the first and second centerlines are offset with respect to each other, wherein the first aperture defined by the blade is configured to prevent the blade from being installed on the lawn maintenance device upside-down relative to an intended orientation.

2. The blade according to claim 1, wherein the first portion and the second portion have the same shape and dimensions.

3. The blade according to claim 1, wherein the first portion and the second portion each have a stadium shape of the same dimensions.

4. The blade according to claim 1, wherein the blade further defines a second aperture offset from the center axis, the blade major axis and the second blade axis.

5. The blade according to claim 4, wherein the second aperture is partially defined by a surface configured to receive rotational power from the lawn maintenance device.

6. The blade according to claim 5, wherein the blade further defines a third aperture spaced apart from the first aperture and offset from the center axis, the blade major axis and the second blade axis.

7. The blade according to claim 6, wherein the third aperture is partially defined by a surface configured to receive rotational power from the lawn maintenance device.

8. The blade according to claim 7, wherein a center point of the second aperture surface and a center point of the third aperture surface are located on a line that is not parallel to the blade major axis, and the line passes through the center axis.

9. The blade according to claim 6, wherein the second aperture and the third aperture are located on a pin line passing through the center axis and at an angle to the blade major axis and the second blade axis.

10. The blade according to claim 1, wherein the first aperture has an asymmetric shape and is asymmetric about the blade major axis.

11. The blade according to claim 1, wherein the blade is configured to receive rotational power from the lawn maintenance device at the first aperture.

12. A blade for a lawn maintenance device comprising:

a blade having a blade major axis, a second blade axis perpendicular to the blade major axis, and a center axis perpendicular to the blade major axis and the second blade axis;

wherein the blade defines a first aperture that is asymmetric and is centrally located and the first aperture has a first portion and a second portion partially intersecting the first portion, wherein the first portion has a long dimension, a short dimension and a first centerline along its long dimension, the second portion has a long dimension, a short dimension and a second centerline along its long dimension, and the first and second centerlines are generally parallel to each other, but not parallel to the blade major axis or the second blade axis, the first and second centerlines are offset with respect to each other, wherein the first portion and the second portion each include an elongated shape having parallel sides, a first end having a first radius, and a second end having a second radius that is greater than the first radius of the first end.

* * * * *